United States Patent
Wang et al.

(10) Patent No.: US 11,387,915 B2
(45) Date of Patent: Jul. 12, 2022

(54) DIPOLE-COUPLED DEFECTS AS ENTANGLED PHOTON PAIR SOURCES

(71) Applicant: President and Fellows of Harvard College, Cambridge, MA (US)

(72) Inventors: Derek S. Wang, Cambridge, MA (US); Tomas Neuman, Cambridge, MA (US); Prineha Narang, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 17/233,474

(22) Filed: Apr. 17, 2021

(65) Prior Publication Data
US 2021/0328685 A1    Oct. 21, 2021

Related U.S. Application Data

(60) Provisional application No. 63/011,568, filed on Apr. 17, 2020.

(51) Int. Cl.
| *H04B 10/00* | (2013.01) |
| *H04B 10/70* | (2013.01) |
| *G06N 10/00* | (2022.01) |
| *H04J 14/00* | (2006.01) |

(52) U.S. Cl.
CPC ............. *H04B 10/70* (2013.01); *G06N 10/00* (2019.01)

(58) Field of Classification Search
CPC ......... H04B 10/70; H01S 5/11; G02F 1/3526; G02B 1/005
See application file for complete search history.

(56) References Cited

U.S. PATENT DOCUMENTS

| 10,886,486 | B1 * | 1/2021 | Montgomery | .......... H01L 51/56 |
| 2020/0106445 | A1 * | 4/2020 | Kerman | ............. H03K 19/1952 |

* cited by examiner

*Primary Examiner* — Daniel G Dobson
(74) *Attorney, Agent, or Firm* — Alexander Akhiezer; Erik A. Huestis; Foley Hoag LLP

(57) ABSTRACT

Devices comprising dipole-coupled defects for use as entangled photon pair sources are provided.

14 Claims, 15 Drawing Sheets

TABLE I. Eigenstates and eigenenergies of $H_{\text{el}}$.

| | Eigenstate | Eigenenergy |
|---|---|---|
| 1 | $|g\rangle \equiv |gg\rangle$ | $\hbar\omega_g = 0$ |
| 2 | $|y_A\rangle \equiv \frac{1}{\sqrt{2}}(|gy\rangle - |yg\rangle)$ | $\hbar\omega_{y_A} = \hbar\omega_y - J_{yy}$ |
| 3 | $|y_S\rangle \equiv \frac{1}{\sqrt{2}}(|gy\rangle + |yg\rangle)$ | $\hbar\omega_{y_S} = \hbar\omega_y + J_{yy}$ |
| 4 | $|x_S\rangle \equiv \frac{1}{\sqrt{2}}(|gx\rangle + |xg\rangle)$ | $\hbar\omega_{x_S} = \hbar\omega_x - J_{xx}$ |
| 5 | $|x_A\rangle \equiv \frac{1}{\sqrt{2}}(|gx\rangle - |xg\rangle)$ | $\hbar\omega_{x_A} = \hbar\omega_x + J_{xx}$ |
| 6 | $|yy\rangle$ | $\hbar\omega_{yy} = 2\hbar\omega_y$ |
| 7 | $|xy_S\rangle \equiv \frac{1}{\sqrt{2}}(|xy\rangle + |yx\rangle)$ | $\hbar\omega_{xy_S} = \hbar(\omega_x + \omega_y)$ |
| 8 | $|xy_A\rangle \equiv \frac{1}{\sqrt{2}}(|xy\rangle - |yx\rangle)$ | $\hbar\omega_{xy_A} = \hbar\omega_{xy}$ |
| 9 | $|xx\rangle$ | $\hbar\omega_{xx} = 2\hbar\omega_x$ |

FIG. 10

TABLE II. The dipole operator $d$ in the eigenbasis.

| Initial | Final | $d$ |
|---|---|---|
| $|g\rangle$ | $|xS\rangle$ | $\sqrt{2}d_x\hat{x}$ |
| $|g\rangle$ | $|yS\rangle$ | $\sqrt{2}d_y\hat{y}$ |
| $|xS\rangle$ | $|xyS\rangle$ | $d_y\hat{y}$ |
| $|yS\rangle$ | $|xyS\rangle$ | $d_x\hat{x}$ |
| $|xS\rangle$ | $|xy\rangle$ | $\sqrt{2}d_x\hat{x}$ |
| $|yS\rangle$ | $|yy\rangle$ | $\sqrt{2}d_y\hat{y}$ |
| $|xA\rangle$ | $|xyA\rangle$ | $d_y\hat{y}$ |
| $|yA\rangle$ | $|xyA\rangle$ | $d_x\hat{x}$ |

FIG. 11

DIPOLE-COUPLED DEFECTS AS ENTANGLED PHOTON PAIR SOURCES

STATEMENT REGARDING FEDERALLY SPONSORED RESEARCH OR DEVELOPMENT

This invention was made with government support under DE-SC0019140 and DE-AC05-00OR22725 awarded by the U.S. Department of Energy. The government has certain rights in the invention.

BACKGROUND

Embodiments of the present disclosure relate to entangled photon pair sources, and more specifically, to dipole-coupled defects as entangled photon pair sources.

BRIEF SUMMARY

In a first example embodiment, the present invention is a device, comprising a substrate, comprising at least a first and a second quantum emitters, said first and second quantum emitters forming a quantum system, the at least first and second quantum emitters being dipole-dipole coupled; and a coherent light source optically coupled to the substrate. Each of the first and second quantum emitters has a ground state and at least a first and a second excited states, wherein the at least first and second excited states have transition dipole moments with respect to the ground state, said dipole moments being orthogonal. The coherent light source is configured to prepare the quantum system in a state of symmetric superposition of two quantum states of the system: (i) a state in which the first quantum emitter is in the first excited state and the second quantum emitter is in the second excited state, and (ii) a state in which the first quantum emitter is in the second excited state and the second quantum emitter is in the first excited state.

Dipole moments are said to be orthogonal when the electromagnetic waves emitted due to a transition from the first excited state to the ground state and a transition from the second excited state to the ground state are orthogonally polarized.

In a second example embodiment, the present invention is a method of producing entangled photon pairs. The method comprises: configuring a coherent light source to prepare a quantum system in a target quantum state, wherein the quantum system comprises a first and a second quantum emitters, each of the first and second quantum emitters having a ground state and at least a first and a second excited states having transition dipole moments with respect to the ground state, said dipole moments being orthogonal. The target quantum state is a state of symmetric superposition of two quantum states of the system: (i) a state in which the first quantum emitter is in a first excited state and the second quantum emitter is in a second excited state, and (ii) a state in which the first quantum emitter is in a second excited state and the second quantum emitter is in a first excited state. The method further comprises illuminating by the coherent light a substrate comprising the at least first and second quantum emitters, the at least first and second quantum emitters being dipole-dipole coupled.

BRIEF DESCRIPTION OF THE SEVERAL VIEWS OF THE DRAWINGS

FIG. 10 is a table of eigenstates and eigenenergies according to embodiments of the present disclosure.

FIG. 11 is a table of the dipole operator in the eigenbasis according to embodiments of the present disclosure.

DETAILED DESCRIPTION

Figure 1:
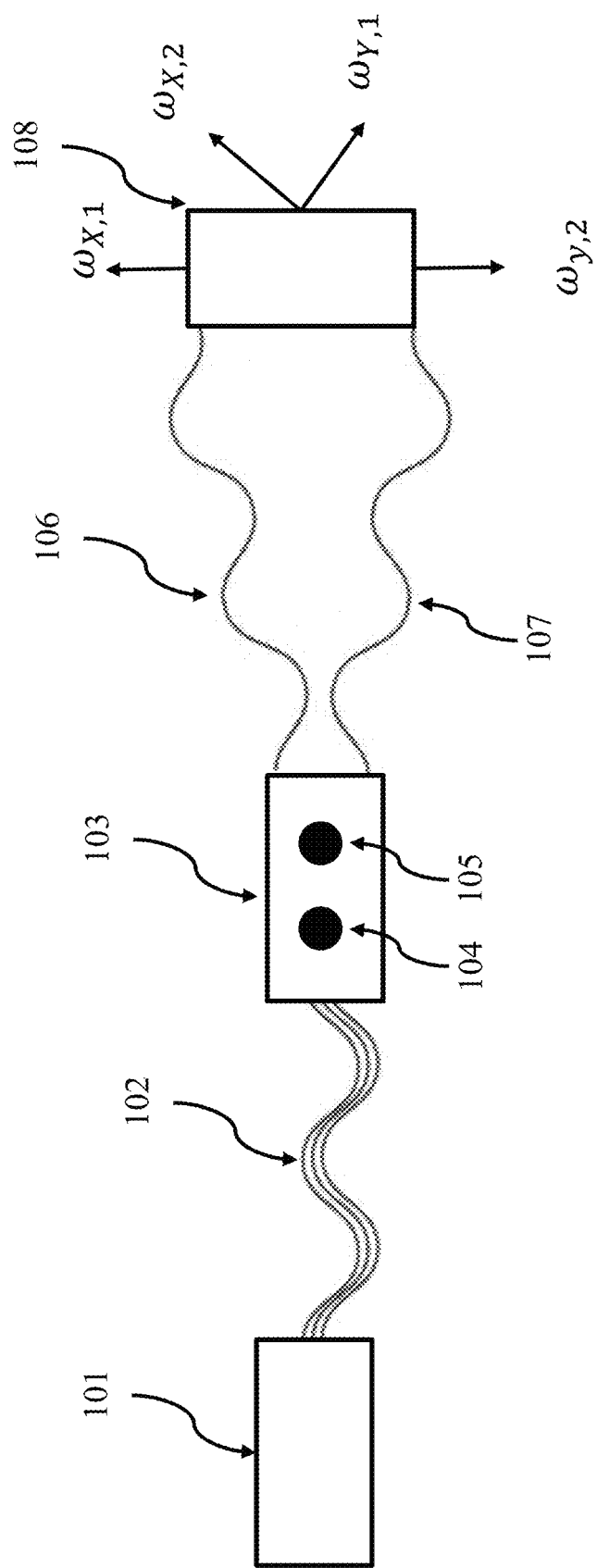
FIG. 1 is a schematic view of an exemplary device for producing entangled photon pairs according to embodiments of the present disclosure.

Scalable quantum systems require deterministic entangled photon pair sources. The present disclosure provides devices, systems, and methods that use a dipole-coupled defect pair to deterministically emit polarization-entangled photon pairs. Defect-based entangled photon pair sources have numerous advantages including flexible on-chip photonic integration and tunable emission properties via external fields, electromagnetic environments, and defect selection.

In various embodiments, the present disclosure provides an on-demand, on-chip, solid-state, and chemically stable entanglement generator for quantum information processors and networking devices, quantum sensors, and nanoscale photon sources for quantum optics.

In various embodiments, devices according to the present disclosure includes two electric-dipole coupled defects. Each defect consists of one or few atomic substitutions, vacancies, or combinations thereof in a semiconducting or insulating solid-state material. The electronic energy structure of the defect consists of at least one non-degenerate ground state and two excited states with orthogonal transition dipole moments from the ground state, where all the states are spatially localized within several angstroms of the defect site and localized in energy within the band gap of the solid-state material. When the defects are electric dipole-coupled by placing them at least several unit cells away from each other such that the localized orbitals of the defects do not hybridize (on the order of 2 to 200 nm), they can be prepared in a symmetric superposition of doubly excited product states. When this state de-excites, an entangled photon pair is emitted. The solid-state material may be 2D (for instance, mono-, few-, or stacked hetero-layers, such as hexagonal boron nitride, transition metal dichalcogenides) or 3D (for instance, diamond, silicon carbide, aluminum oxide).

It will be appreciated that the 2D and 3D materials listed herein are not exhaustive. The solid-state host of the defects may be any insulator or semiconductor. More generally, any material with a non-zero band gap may be suitable for use as described herein, as may any materials with a bandgap of at least 15 eV. If the desired emission frequency of the photons is higher, then a larger band gap would be required to host the localized defect orbitals. The requirements of the defects themselves within the solid-state host are described elsewhere herein.

Suitable pumping schemes are discussed elsewhere herein, but it will be appreciated that any scheme resulting in population of a symmetric doubly excited state is suitable for use as set out herein.

Various embodiments include: alternative pumping schemes; methods to enhance fidelity and augmented emission efficiency of emitted photon pairs by coupling to waveguides, cavities, and external fields, including electric, magnetic, and strain fields; optimizing the energy level differences and transition dipole moments between the excited states of the two defects; and arranging the electric dipole-coupled defect pairs with other defects serving as quantum memories or emitters on the same material to minimize the footprint and manufacturing overhead of quantum devices. More generally, emitters as set out herein may be integrated on chip with quantum memories, emitters, sensors, and transducers.

As set out above, two defects are used that are within the range of electric dipole-coupling with the appropriate level structures and that are excited into the symmetric superposition of doubly excited product states. The defects must may be created and selected and excited into the correct state, of which there are nine for a system with two defects that each have the minimum three states (one ground and two excited). Several methods may be used to stochastically create two nearby defects.

In some embodiments, optical or electron-based imaging techniques are used to find defects that have stochastically been implanted close enough for dipole-coupling. These methods include, but are not limited to: ion implantation that creates defects with low spatial control; epitaxial growth of defects in crystals that involves growing a crystal via, e.g., chemical vapor deposition or molecular beam epitaxy in the presence of contaminants that form atomic defects; detonation of host material in the presence of defect constituents to create nanocrystals containing defects; high pressure-high temperature in the presence of defect constituents to create, e.g., diamonds with defects. More deterministic methods of creating defects include: scanning tunnel microscopy, a technique that allows for atomic-level imaging of surfaces and can be adapted to create defects on-demand with high spatial control; and high spatial resolution electron microscopy, where the electron beam can knock out atoms and create defects.

Alternative approaches for production of entangled photon pairs include semiconductor quantum dots. The microscopic physical mechanism, the biexciton decay cascade, underlying their ability to emit entangled photon pairs is different from the defect-based approaches described herein. Semiconductor quantum dots are challenging to synthesize consistently, which affects the efficiency and fidelity of emitted photon pairs, and their integration on-chip is challenging.

Referring now to FIG. 1, a schematic view of an exemplary device according to embodiments of the present disclosure is provided. The device includes: a light source for preparing the system in the symmetric doubly excited state; a dipole-coupled defect pair; and a binner.

In this example, pump laser 101 emits coherent light 102, which is directed to solid state host 103. Solid state host 103 contains dipole coupled defects 104, 105. Entangles photons 106, 107 are emitted and directed to binner 108. Binner 108 performs separation by polarization and frequency.

Figure 2:
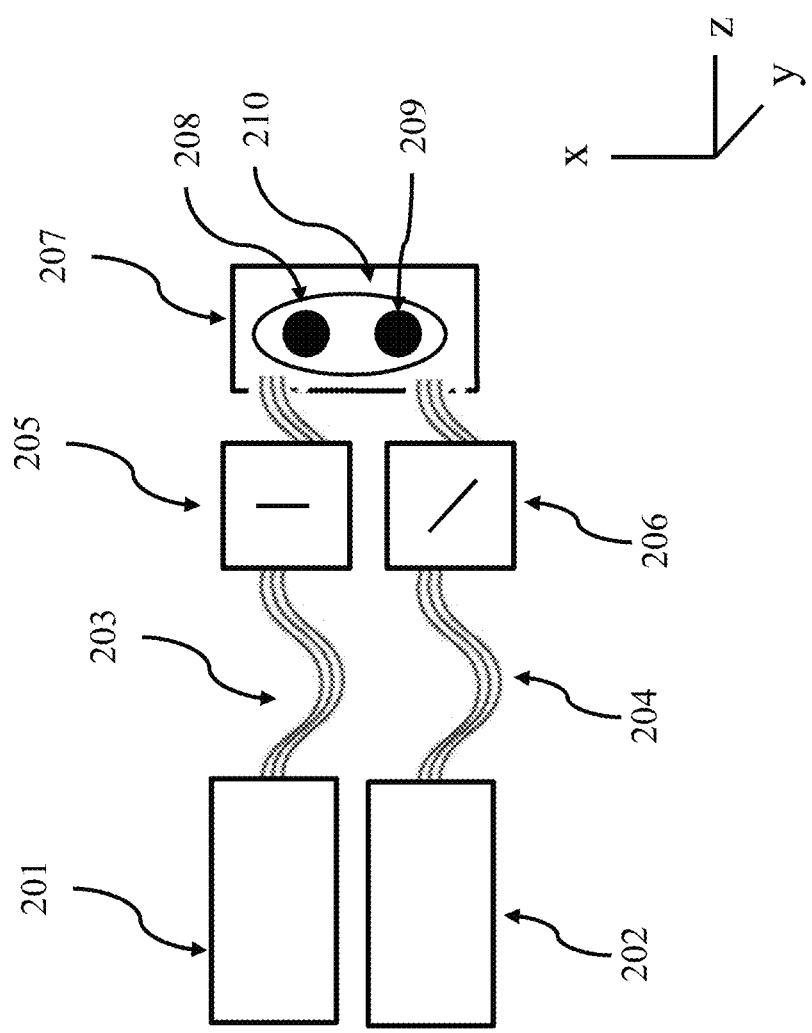
FIG. 2 is a schematic view of an exemplary light source according to embodiments of the present disclosure.

Referring now to FIG. 2, a schematic view of an exemplary light source according to embodiments of the present disclosure is provided. The light source may include a coherent, x-polarized source with central frequency $\omega_{X,1}$ and a coherent, y-polarized source with central frequency $\omega_{Y,2}$; or a coherent, x-polarized source with central frequency $\omega_{X,2}$ and a coherent, y-polarized source with central frequency $\omega_{Y,1}$. Either option will prepare the dipole-coupled defect pair (shown in FIG. 3) with the appropriate energy structure into the symmetric doubly excited state from which an entangled photon pair can be emitted.

In this example, lasers 201, 202 emit coherent light 203, 204, which is directed to x-polarizer 205 and y-polarizer 206, respectively. It will be appreciated that in various embodiments, a single laser may be used. As in FIG. 1, solid state host 207 contains dipole coupled defects 208, 209. The beam spot 210 of the pump light covers both defects 208, 209.

Upon emission, the emitted photon pair in binned according to: x- or y-polarization; and frequency 1 or 2 with polarization- or frequency-beam splitters, respectively. The binning can occur in either order, so both possibilities are drawn for a microcavity coupled to polarization (or frequency) beam splitters in FIG. 4.

Figure 4:
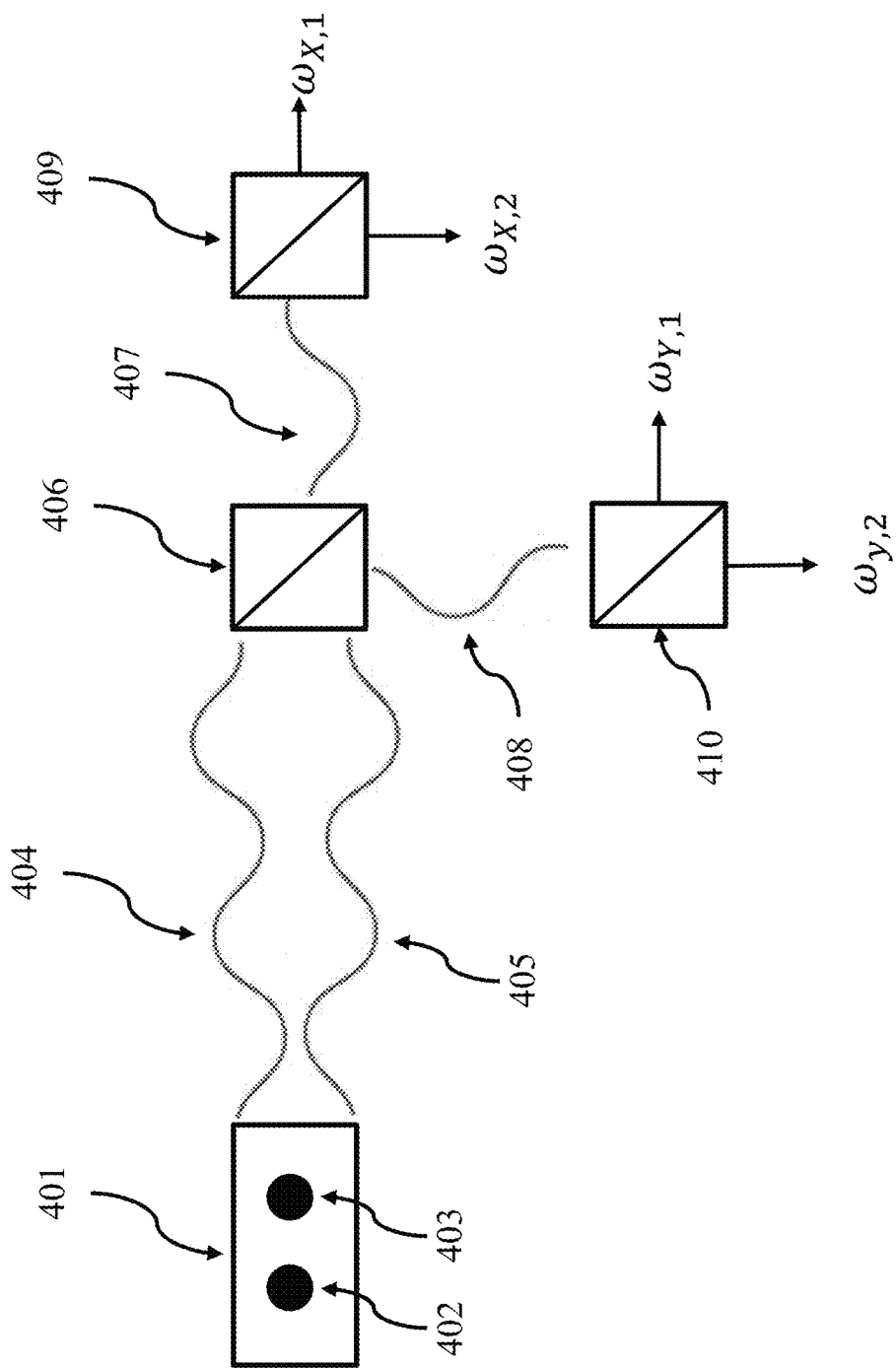
FIG. 4 is a schematic view of an exemplary binner according to embodiments of the present disclosure.

Referring to FIG. 4, a schematic view of an exemplary binner is according to embodiments of the present disclosure is provided. In this example, solid state host 401 contains dipole coupled defects 402, 403. As in FIG. 1, entangles photons 404, 405 are emitted, which are directed to polarizing beam splitter 406. Polarizing beam splitter 406 directs y-polarized light 407 light to frequency splitter 409 and x-polarized light 408 to frequency splitter 410. Frequency splitters 409, 410 then complete the binning of $\omega_{X,1}$, $\omega_{Y,2}$, $\omega_{X,2}$, and $\omega_{Y,1}$.

Filters to output certain output frequency ranges or to control whether a pair or a single photon is emitted are advantageously not necessary.

Figure 3:
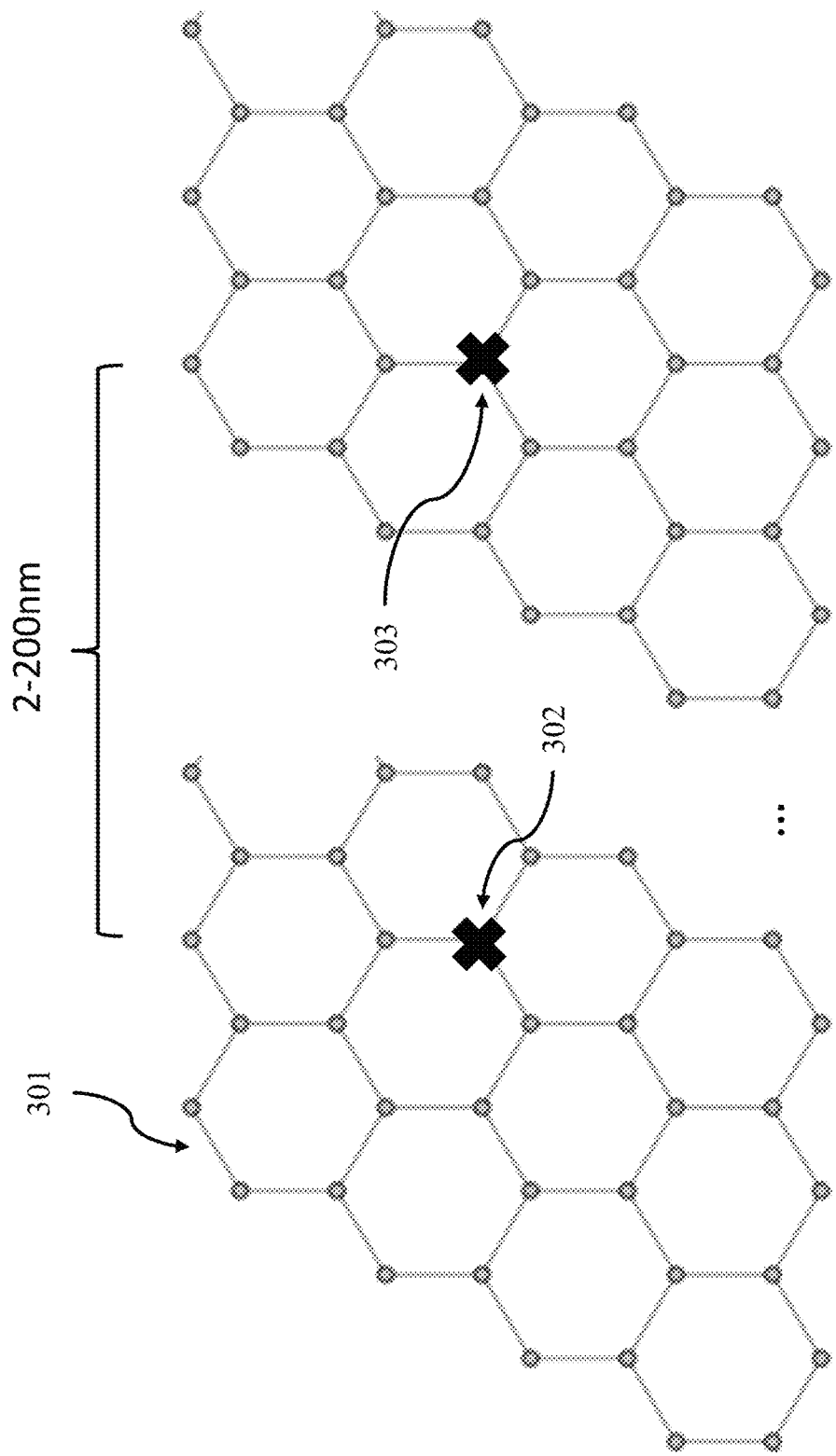
FIG. 3 is a schematic view of an exemplary dipole-coupled defect pair according to embodiments of the present disclosure.

Referring to FIG. 3, a schematic view of an exemplary solid state crystal lattice is provided according to embodiments of the present disclosure. Lattice 301 contains defects 302, 303. In various embodiments, the defects may be separated by approximately 2-200 nm.

As set out herein, in various embodiments devices are provided with two electric-dipole coupled defects. Each defect consists of one or few atomic substitutions, vacancies, or combinations thereof in a semiconducting or insulating solid-state material. The electronic energy structure of the defect consists of at least one non-degenerate ground state and two excited states with orthogonal transition dipole moments from the ground state, where all the states are spatially localized within several angstroms of the defect site and localized in energy within the band gap of the solid-state material. When the defects are electric dipole-coupled by placing them at least several unit cells away from each other such that the localized orbitals of the defects do not hybridize (on the order of 2 to 200 nm), they can be prepared in a symmetric superposition of doubly excited product states. Pumping schemes are discussed below. When this state de-excites, an entangled photon pair is emitted. The solid-state material may be 2D (for instance, mono-, few-, or stacked hetero-layers, such as hexagonal boron nitride, transition metal dichalcogenides) or 3D (for instance, diamond, silicon carbide, aluminum oxide).

Devices according to the present disclosure are adaptable to a variety of pumping schemes. They may be combined with a variety of methods to enhance fidelity and augmented emission efficiency of emitted photon pairs by coupling to waveguides, cavities, and external fields, including electric, magnetic, and strain fields. The electric dipole-coupled defect pairs may be arranged with other defects serving as quantum memories or emitters on the same material to minimize the footprint and manufacturing overhead of quantum devices.

As set out above, defects must be created and selected a priori and excited into the correct state, of which there are nine for a system with two defects that each have the minimum three states (one ground and two excited). There are several methods that stochastically create two nearby defects. Optical or electron-based imaging techniques may be used to find defects that have stochastically been implanted close enough for dipole-coupling.

These methods include, but are not limited to: a) ion implantation that creates defects with low spatial control, b) epitaxial growth of defects in crystals that involves growing a crystal via e.g., chemical vapor deposition or molecular beam epitaxy in the presence of contaminants that form atomic defects, c) detonation of host material in the presence of defect constituents to create nanocrystals containing defects, d) high pressure-high temperature in the presence of defect constituents to create e.g., diamonds with defects. More deterministic methods of creating defects include a) scanning tunnel microscopy, a technique that allows for atomic-level imaging of surfaces and can be adapted to create defects on-demand with high spatial control and b) high spatial resolution electron microscopy, where the electron beam can knock out atoms and create defects.

It will be appreciated that the physical mechanism of devices set out herein are substantially different from using semiconductor quantum dots as entangled photon pair sources. In particular, unlike the present disclosure, semiconductor quantum dots rely on the biexciton decay cascade. Semiconductor quantum dots are challenging to synthesize consistently, which affects the efficiency and fidelity of emitted photon pairs, and their integration on-chip is challenging.

In various embodiments, the dipole-coupled defect system is pumped from the ground state to the symmetric doubly excited state via two-photon absorption, where the light source comprises two lasers, one of which is x-polarized and the other is y-polarized. There are, in fact, two possible pathways from the ground state to the symmetric doubly excited state. In one of the two pathways, the x-polarized laser emits with frequency $\omega_{X,1}-\delta$ and the y-polarized laser emits with frequency $\omega_{Y,2}+\delta$, where $\delta$ is some frequency detuning and can be negative or positive. In the other pathway, the x-polarized laser emits with frequency $\omega_{X,2}-\delta$ and the y-polarized laser emits with frequency $\omega_{Y,1}+\delta$. The former pathway corresponds to climbing the left path in FIG. 5C, and the latter pathway corresponds to the right path in FIG. 5C. The lasers are detuned by $\delta$ so that only the symmetric doubly excited state is populated and not any of the intermediate states that would be pumped if $\delta$ were zero.

The binner in various embodiments spatially separates (bins) the emitted photons by frequency and polarization so that a user of the device knows that if a detector is placed at one of the outputs of the entangled photon pair source and the detector clicks, then a photon of a given polarization and frequency has been detected. The binner need not be separate from the detector. For instance, the detector may be able to resolve frequencies and polarizations itself. The binner has another important functionality (it also acts as a collector), and that is to collect the emitted photons and emit them in a given direction because otherwise, photons will be emitted everywhere. Whether a collecting mechanism and/or a binning mechanism is required depends on the application. In particular, whether the user of the entangled photon pairs would like to separate them by polarization and frequency, and the collection efficiency that the user desires will impact whether a binner is included in a given embodiment.

In an exemplary chip for quantum computing, there are qubits (quantum memories), mechanisms for implementing quantum gates, and mechanisms for initializing qubits. Some algorithms, such as entanglement swapping that can be used in quantum repeaters, require that the pairs of qubits are initially entangled with each other. This can be implemented by deterministically emitting an entangled photon pair according to the present disclosure, and each of the two qubits to be entangled absorbs one photon of the pair. To ensure efficiency absorption of the photon, the qubits may be coupled to the source via a waveguide, for instance.

Because achievable dipole splittings are on the order of tens of GHz (gigahertz, or tens of micro electronvolts, or millikelvin), then operating temperatures should be lower than these dipole splittings. These temperatures can be accomplished in dilution fridges, a common environment for defect-based quantum technologies. If defects are placed closer together and/or defects with larger transition dipole moments are used, then it is possible to increase the operating temperature, for example to 4 kelvin corresponding to liquid helium. The limiting factor of high-fidelity emission of entangled photon pairs is the linewidth of the emitted photons, which, for emission into free space, is on the order of 1 micro electronvolt, thus requiring millikelvin temperatures. However, if the linewidth were to be increased by coupling the defect to, say, a bad cavity that increases the emission rate of the photons via the Purcell effect, then higher temperatures may be used.

The minimum wavelength (maximum frequency) of the emitted photon is limited by how large the band gap is, as the transition frequencies must lie within the band gap. Hexagonal boron nitride, for example, has a band gap of 6 eV, so a defect may emit with up to 6 eV. Defects have been observed to emit from the IR range to the UV range, and so devices according to the present disclosure are able to emit photons within a similar frequency range depending on the exact defect chosen. The minimum frequency is limited by noise and is likely far below what is practically useful. For instance, quantum networking applications require IR/near IR photons that have frequencies substantially higher than thermal noise in dilution fridges and even liquid helium.

The present disclosure provides a scheme that uses a dipole-coupled emitter pair to deterministically emit polarization-entangled photon pairs. Based on this scheme, spectroscopic signatures are predicted and the entanglement is quantified with realistic material parameters. In addition, it is described how the Bell state fidelity and efficiency can be optimized by precisely tuning transition frequencies. It is discussed how defect emitters are natural candidates for the proposed scheme, offering numerous advantages including flexible on-chip photonic integration and tunable emission properties via external fields, electromagnetic environments, and defect selection.

Non-classical states of light are important resources for quantum technologies, such as quantum information processing, networking, and metrology. Entangled photon pairs, in particular, have applications in solid-state quantum repeaters, a crucial component of long-distance quantum networking that overcomes transmission loss by leveraging the effects of entanglement swapping and quantum teleportation. Despite the diverse applications for such non-classical states of light, methods for generating them deterministically remain limited. Alternative approaches are based on spontaneous parametric down-conversion or spontaneous four-wave mixing with high performance. A major drawback of such methods is that the number of photon pairs generated follows a Poissonian distribution, rendering the pair generation efficiency too low for scalable quantum systems. Semiconductor quantum dots can deterministically emit entangled photon pairs via biexciton decay cascade with high fidelity and emission efficiency. This mechanism, however, requires careful engineering of quantum dots and pumping schemes that poses a technological challenge, motivating the search for alternative pathways to the generation pairs.

A basis is provided herein for a deterministic entangled photon pair source from a pair of dipole-coupled three-level quantum emitters. Each emitter consists of a ground state and two optically active electronic excited states with mutually orthogonal transition dipole moments. The emergent electronic structure of the composite system then allows for the implementation of a radiative decay cascade from a symmetric doubly excited state of the pair, which results in the emission of two entangled photons of orthogonal polarization. The resulting emission spectra are analyzed to note qualitative signatures of entanglement, especially in the cross-correlation spectrum.

To better quantify the entanglement of the emitted photon pairs in continuous frequency space, their entanglement entropy S and Bell state fidelity $\mathcal{F}$ are calculated. Importantly, Bell state fidelity $\mathcal{F}$ can be optimized at the expense of the entanglement entropy S by tuning the defect transition dipole moments and concentrating the probability density within the states of interest, or the ideal Bell state. In addition, the entanglement measures of the emitted photons are robust to relative differences in frequency between the intermediate states, while the fidelity in the presence of phonon-based dephasing is limited when the dephasing rate is on the order of the radiative rate or higher. A method is also provided of initializing the system with orthogonally-polarized continuous wave lasers that involves two-photon absorption to enable Rabi oscillations between the ground and symmetric doubly excited state of the pair.

This scheme has the advantage of requiring only emitters with well-understood singly-excited states that could be realized by a variety of physical systems, whereas accurate determination of the energetics of multiply-excited states from first principles remains a challenge. The applicability of defect emitters is discussed, given their fixed geometries enabling stable dipole-coupling, diverse symmetries that allow non-degenerate transitions with orthogonal transition dipole moments, and emission properties that can be tailored via external fields. In addition, the chemical selection space of defect systems is vast. The present scheme is, however, likely amenable to dipole-coupled quantum dots or molecules as well, although they may lack certain advantages of dipole-coupled defect centers. The ability to generate entangled photon pairs from defects would enable on-chip integration with quantum memories and emitters, minimizing the need to transduce photons from source to storage to emission in quantum technologies.

Figure 5:
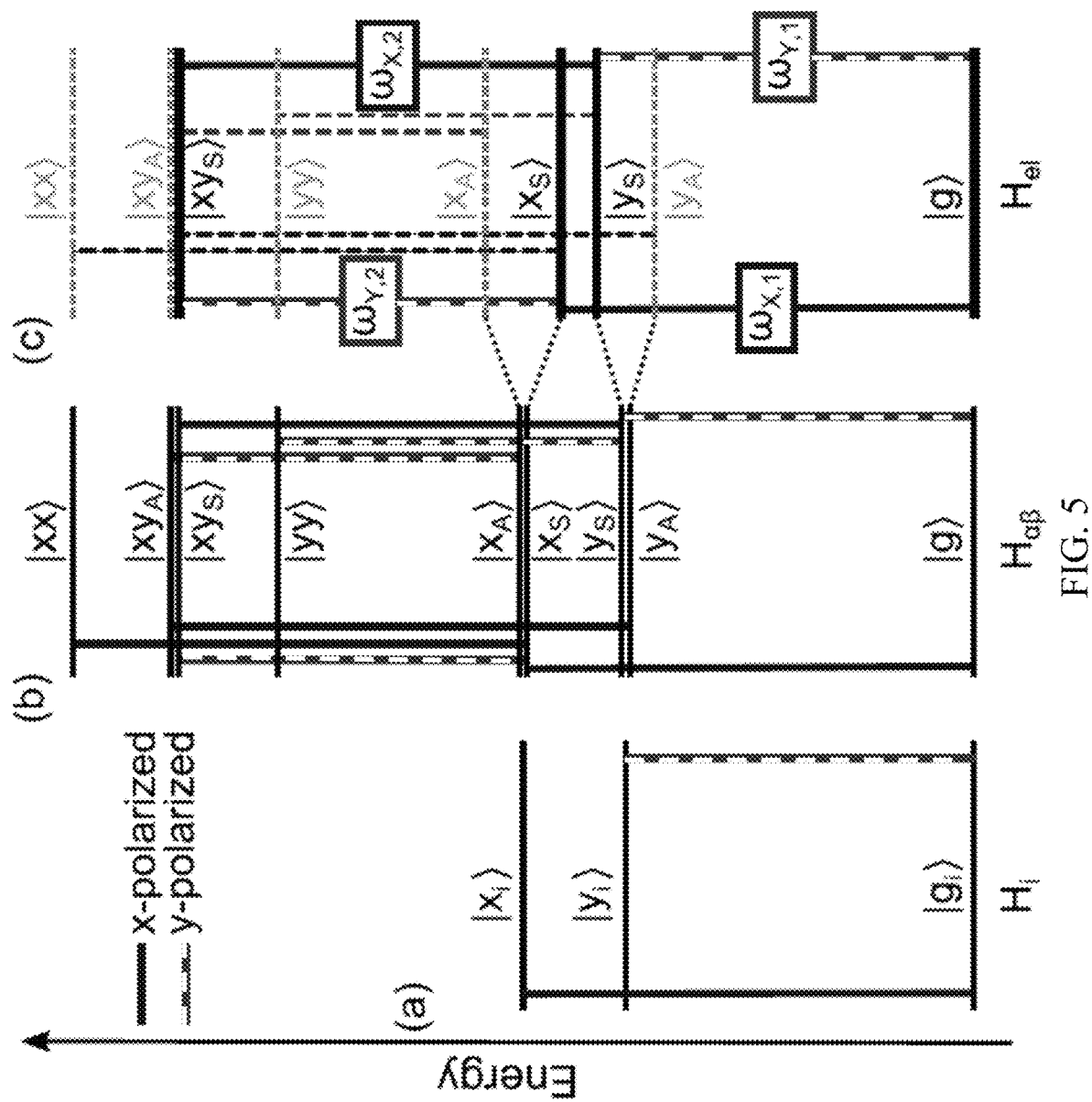
FIG. 5 contains energy level diagrams including dipole-allowed transitions according to embodiments of the present disclosure.

Referring to FIG. 5, energy level diagrams are provided including dipole-allowed transitions. Allowed x- and y-polarized transitions are dotted and solid, respectively. The leftmost diagram depicts a single three-level emitter. The middle diagram depicts two distantly separated three-level emitters such that dipole-coupling is negligible. The rightmost diagram depicts two dipole-coupled, three-level emitters. Bolded states and transitions (with transition frequencies $\omega_{X,1}$, $\omega_{X,2}$, $\omega_{Y,1}$ and $\omega_{Y,2}$) are accessible when the system is prepared in $|xy_S\rangle$.

The system consists of two three-level systems denoted by $i \in \{\alpha, \beta\}$. Each three-level system consists of a ground state $|g_i\rangle$, excited state $|x_i\rangle$ with energy $\hbar\omega_x$ and transition dipole moment $d_{x_i} = \langle x_i|er|g_i\rangle = d_{x_i}\hat{x}$, and excited state $|y_i\rangle$ with energy $\hbar\omega_y$ and transition dipole moment $d_{y_i} = \langle y_i|er|g_i\rangle = d_{y_i}\hat{y}$, where r is the position operator and e is the electron charge. The energy level diagram and dipole-allowed transitions are plotted in FIG. 5 at left. The Hamiltonian $H_i$ of each isolated three-level system can be written as $H_i = \hbar\omega_x|x_i\rangle\langle x_i| + \hbar\omega_y|y_i\rangle\langle y_i|$.

When emitters $\alpha$ and $\beta$ at positions $r_\alpha$ and $r_\beta$, respectively, are brought close and couple via electric dipole interactions, the total electronic Hamiltonian $H_{el}$ can be written in the product space of the two three-level systems as $$H_{el} = H_{\alpha\beta} + H_{dip} \qquad \text{Equation 1}$$

where $H_{\alpha\beta} = H_\alpha + H_\beta$, and the dipole-coupling Hamiltonian $H_{dip}$, in the rotating wave approximation (RWA) where double (de-)excitations are dropped, is given by $$H_{dip} = \sum_{pq \in \{x,y\}} J_{pq}(|gp\rangle\langle qg| + |qg\rangle\langle gp|) \qquad \text{Equation 2}$$

where $|rs\rangle \equiv |r_\alpha\rangle|s_\beta\rangle$ with r, s $\in \{g, x, y\}$, and transition dipole moments are real. Although it is assumed that the emitter states do not have permanent dipole moments, the interactions of static dipoles can be included as diagonal terms in the single emitter subspace. It is also assumed that the orbitals of neighboring emitters do not hybridize in the interdefect ranges considered of a few to tens of nanometers because, for defects specifically, orbitals can be localized within a few angstroms. The dipole interaction energy $J_{pq}$ is $$J_{pq} = \frac{|d_{p_\alpha}||d_{q_\beta}|}{4\pi\epsilon_0\epsilon_r|r_\alpha - r_\beta|^3}[e_{p_\alpha} \cdot e_{q_\beta} - 3(e_{p_\alpha} \cdot n)(e_{q_\beta} \cdot n)] \qquad \text{Equation 3}$$

where $\epsilon_r$ is the relative permittivity of the host material, $e_{s_i}$ is the unit vector of the dipole moment $d_{s_i}$, and n is the unit vector of $r_\alpha - r_\beta$. The coupling rates $J_{pq}$ can be calculated from the ab initio transition charge densities of the respective electronic transitions or can be obtained directly from the ab initio calculations of the excited states of the coupled emitter pair. Since transition dipole moments can be on the order of $\sim 1$ eÅ in small- to medium-sized molecules on the same size-scale as defect emitters, it is estimated that emitters spaced a few nm apart can have dipole interaction energies on the order of tens of µeV.

Assuming for the sake of simplicity that n lies on the x-axis and that the dipole moments of the same polarizations of emitters $\alpha$ and $\beta$ are identical ($d_x \equiv d_{x_\alpha} = d_{x_\beta}$ and $d_y \equiv d_{y_\alpha} = d_{y_\beta}$), $H_{el}$ can be diagonalized to produce nine eigenstates with eigenenergies listed in Table I (FIG. 10). The subscripts "A" and "S" stand for "anti-symmetric" and "symmetric" combinations, respectively. The energy diagram of the eigenstates of $H_{\alpha\beta}$ and $H_{el}$ and their dipole-allowed transitions, derived from the dipole operator d listed in Table II (FIG. 11), are plotted in FIG. 5. Direct transitions between symmetric and anti-symmetric states are dipole-forbidden. From the energy diagram corresponding to $H_{el}$, it is seen that a polarization-entangled photon pair can be emitted when the system is prepared in $|xy_S\rangle$ and irreversibly decays.

Emission spectra into free space are calculated by coupling the emitter system initially prepared in $|xy_S\rangle$ to an unexcited continuum of photon modes and solving the time-dependent Schrödinger equation under the Weisskopf-Wigner approximation.

The total Hamiltonian H of the coupled emitter-photon system is $$H = H_{el} + H_{ph} + H_{el\text{-}ph} \qquad \text{Equation 4}$$

The photonic Hamiltonian $H_{ph}$ is $H_{ph} = \Sigma_{jl} \hbar \omega_j a_{jl}^\dagger a_{jl}$, where $a_{jl}(a_{jl}^\dagger)$ are annihilation (creation) operators of the jth mode in the electromagnetic vacuum of free space with polarization $l \in \{X, Y\}$ and energy $\hbar \omega_j$.

In $H_{ph}$, the zero-point contribution is dropped with no loss of generality.

The electron-photon coupling Hamiltonian in the RWA and dipole approximation is $H_{el\text{-}ph} = -\Sigma_{opjl} \varepsilon_{jl} \cdot d_{op} |o\rangle \langle p| a_{jl}^\dagger +$ H.c., where $\varepsilon_{jl}$ is the electric field with magnitude $\varepsilon$ in the l direction that is assumed to be constant for all j, and $d_{op} = \langle o|er|p\rangle$ with $|o\rangle$ and $|p\rangle$ being quantum states of the combined two-emitter system.

The ansatz for a general electron-photon wave function, noting that for a system prepared in $|xy_S\rangle$ there can be a maximum of two excitations distributed among the electronic and photonic states, is $$|\Psi(t)\rangle = \sum_{jk} c_{jk}^g |g\rangle a_{jX}^\dagger a_{kY}^\dagger |vac\rangle + \sum_j c_j^{xs} |x_S\rangle a_{jY}^\dagger |vac\rangle + \sum_j c_j^{ys} |y_S\rangle a_{jX}^\dagger |vac\rangle + c^{xys} |xy_S\rangle |vac\rangle \qquad \text{Equation 5}$$

where j and k are indices for the continuum of photon modes and $|vac\rangle$ is the photon vacuum state, and $c_{jk}^g$, $c_j^{xs}$, $c_j^{ys}$ and $c^{xys}$ are time-dependent amplitudes. All anti-symmetric, $|yy\rangle$, and $|xx\rangle$ terms are dropped because the emitter system is initially prepared in $|xy_S\rangle$.

The time-dependent Schrödinger equation is solved under the Weisskopf-Wigner approximation to find the final state of the electron-photon system under irreversible spontaneous decay:

$$|\Psi(\infty)\rangle = \sum_{jk} c_{jk}^g(\infty) |g\rangle a_{jX}^\dagger a_{kY}^\dagger |vac\rangle \text{ where} \qquad \text{Equation 6}$$

$$c_{jk}^g(\infty) = \frac{\frac{-\Omega_{g,x_S} \Omega_{x_S,xy_S}}{i\omega_{x_S} - i\omega_j + \gamma_{g,x_S}} + \frac{-\Omega_{g,y_S} \Omega_{y_S,xy_S}}{i\omega_{y_S} - i\omega_k + \gamma_{g,y_S}}}{i(\omega_{xy_S} - \omega_j - \omega_k) + \gamma_{x_S,xy_S} + \gamma_{y_S,xy_S}} \qquad \text{Equation 7}$$

and $\Omega_{op} = -\varepsilon |d_{op}|/\hbar$, $\gamma_{op} = \varepsilon^2 |d_{op}|^2/\Delta$, and $\Delta$ is the frequency spacing. Further details on obtaining Equation 7 are below.

Figure 6A:
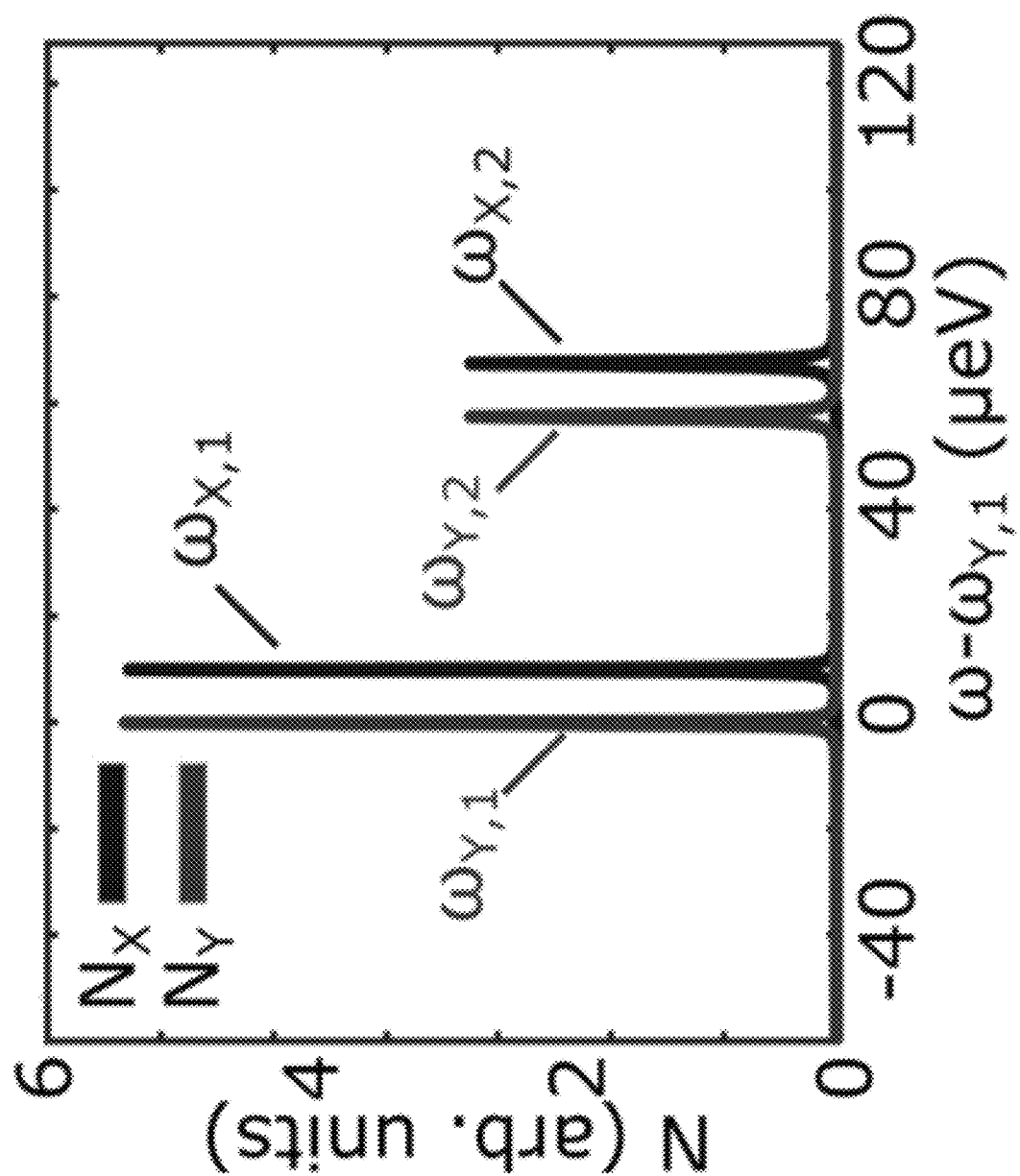
FIG. 6A is a graph of single-photon spectra according to embodiments of the present disclosure.
Figure 6B:
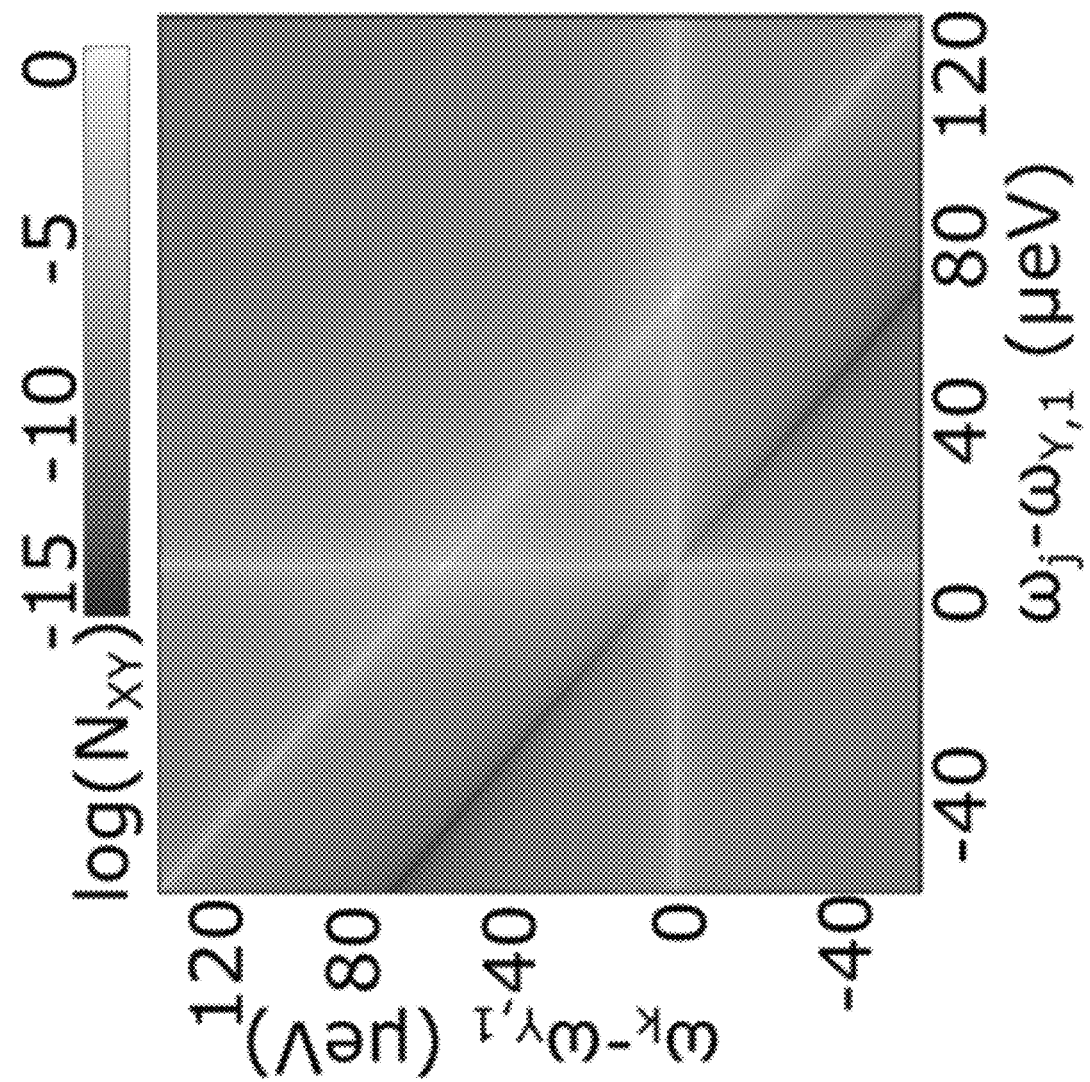
FIG. 6B is a graph of a cross-correlation function according to embodiments of the present disclosure.

Referring to FIG. 6, spectra of an emitted polarization-entangled photon pair are illustrated. In FIG. 6A, the single-photon spectra $N_X(\omega_j)$ and $N_Y(\omega_k)$ corresponding to x- and y-polarized photons, respectively. In FIG. 6B, illustrates the cross-correlation function $N_{XY}(\omega_j, \omega_k)$. Based on experimentally observed ranges of parameters, $\omega_{y_S} = 2\text{eV}$, $\omega_{x_S} = \omega_{y_S} + 10$ μeV, $d_x = d_y = 1\text{eÅ}$, $|r_\alpha - r_\beta| = 5$ nm, $\epsilon_r = 2$, and $\gamma_{g,y_S} = 0.2$ μEv.

The below explores the physical parameters that result in photon pair entanglement. First, spectra are calculated for a photon pair emitted by a dipole-coupled emitter pair and note spectral signatures of entanglement. The Bell state fidelity is optimized by tuning transition frequencies. These changes can be implemented by appropriate selection of an emitter system or applying external fields.

The emission cascade caused by the radiative decay of the optically excitable $|xy_S\rangle$ state of the composite emitter-emitter system results in the emission of x- and y-polarized photons whose number spectra are generally distinct, as shown in FIG. 6A for parameters given in the figure caption. The number spectra, or the probability of finding an x-polarized (y-polarized) photon with frequency $\omega_j[\omega_k]$, are given as $N_X(\omega_j) = \Sigma_k |c_{jk}^g|^2$ $[N_Y(\omega_k) = \Sigma_j |c_{jk}^g|^2]$. While the x-polarized photon spectrum $N_X(\omega_j)$ (blue curve) peaks around the frequencies $\omega_{X,1}$ and $\omega_{X,2}$, the maxima of the y-polarized spectrum are found at $\omega_{Y,1}$ and $\omega_{Y,2}$, corresponding to the respective transitions in the two-photon cascade depicted in the rightmost portion of FIG. 5 as solid and dotted lines.

The emitted x- and y-polarized photons of different frequencies exhibit nontrivial correlations. FIG. 6A plots the cross-correlation function $N_{XY}(\omega_j, \omega_k) = |c_{jk}^g|^2$ measuring the probability to simultaneously detect an x-polarized photon of frequency $\omega_j$ and an y-polarized photon of frequency $\omega_k$. The cross-correlation function features local maxima at two points. When an x-polarized photon is detected with frequency $\omega_{X,1}$, the y-polarized photon is most likely detected with frequency $\omega_{Y,2}$ [i.e., $N_{XY}(\omega_{X,1}, \omega_{Y,2})$ is a maximum], and when an x-polarized photon is detected with frequency $\omega_{X,2}$, the probability of simultaneously finding an y-polarized photon peaks for frequency $\omega_{Y,1}$. This correlated behavior for a pure state is an intuitive signature of bipartite entanglement.

Consider two metrics to rigorously quantify the entanglement of emitted photon pairs. The first metric is the entanglement entropy S:

$$S = -\sum_n |\lambda_n|^2 \log_2 |\lambda_n|^2 \qquad \text{Equation 8}$$

The singular values $\lambda_n$ is found by Schmidt decomposition of the photonic portion $|\Psi_{ph}\rangle$ of the final state in Equation 6:

$$|\Psi_{ph}\rangle = \sum_n \lambda_n b_{nX}^\dagger c_{nY}^\dagger |vac\rangle \qquad \text{Equation 9}$$

where the creation operators $b_{nX}^\dagger = \Sigma_j \psi_{nj} a_{jX}^\dagger$ and $c_{nY}^\dagger = \Sigma_k \phi_{nk} a_{kY}^\dagger$ in the Schmidt basis, $\lambda_n$ represent wave function coefficients in decreasing order with n, and $\psi_{nj}$ and $\phi_{nk}$ are the eigenfunctions of $c_{jk}^g$. The entanglement entropy is zero if the state is factorizable and greater than zero for an entangled state.

In protocols based on entanglement, it is often convenient to work directly with Bell states, so the second and third metrics considered are the Bell state efficiency η and fidelity $\mathcal{F}$, where the Bell state $$|\Psi^+\rangle = \frac{1}{\sqrt{2}}(|10\rangle + |01\rangle)$$

in the logical basis. To write $|\Psi_{ph}\rangle$ in the logical basis, we assign the Schmidt states defined by the two pairs of $b_{nX}^\dagger$ and $c_{nY}^\dagger$ with the highest $\lambda_n$ to $|10\rangle$ and $|01\rangle$, respectively:

$$|\Psi_{ph}\rangle = \lambda_0|10\rangle + \lambda_1|01\rangle + \sum_{n\geq 2}\lambda_n b_{nX}^\dagger c_{nY}^\dagger|vac\rangle \qquad \text{Equation 10}$$

All states where n≥2 are traced out to write the reduced density matrix $\rho_R$ as $$\rho_R = (\lambda_0^2 + \lambda_1^2)|\psi\rangle\langle\psi| + \sum_{n\geq 2}\lambda_n^2|00\rangle\langle 00| \qquad \text{Equation 11}$$

where $|\psi\rangle = 1/\sqrt{\lambda_0^2+\lambda_1^2}(\lambda_0|10\rangle+\lambda_1|01\rangle)$.

The efficiency $\eta$ of collecting $|10\rangle$ and $|01\rangle$ is $$\eta = \lambda_0^2 + \lambda_1^2 \qquad \text{Equation 12}$$

and the Bell state fidelity $\mathcal{F} = |\langle\Psi^+|\psi\rangle\mathcal{F}|^2$ is $$\mathcal{F} = \frac{1}{2}\frac{(\lambda_0+\lambda_1)^2}{\lambda_0^2+\lambda_1^2} \qquad \text{Equation 13}$$

Figure 7A:
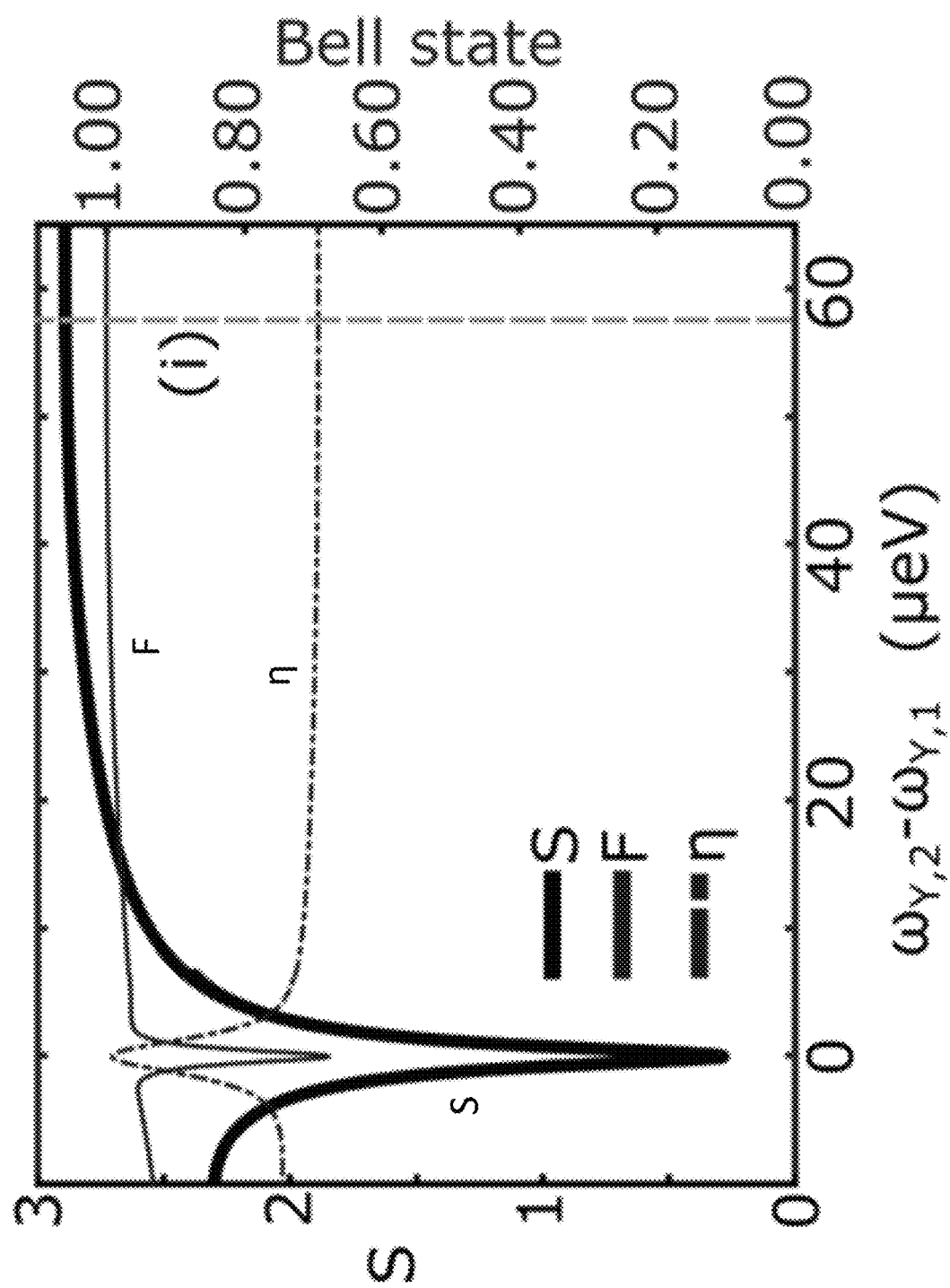
FIGS. 7A-C are graphs of entanglement entropy S, Bell state efficiency η, and Bell state fidelity $\mathcal{F}$ according to embodiments of the present disclosure.
Figure 7B:
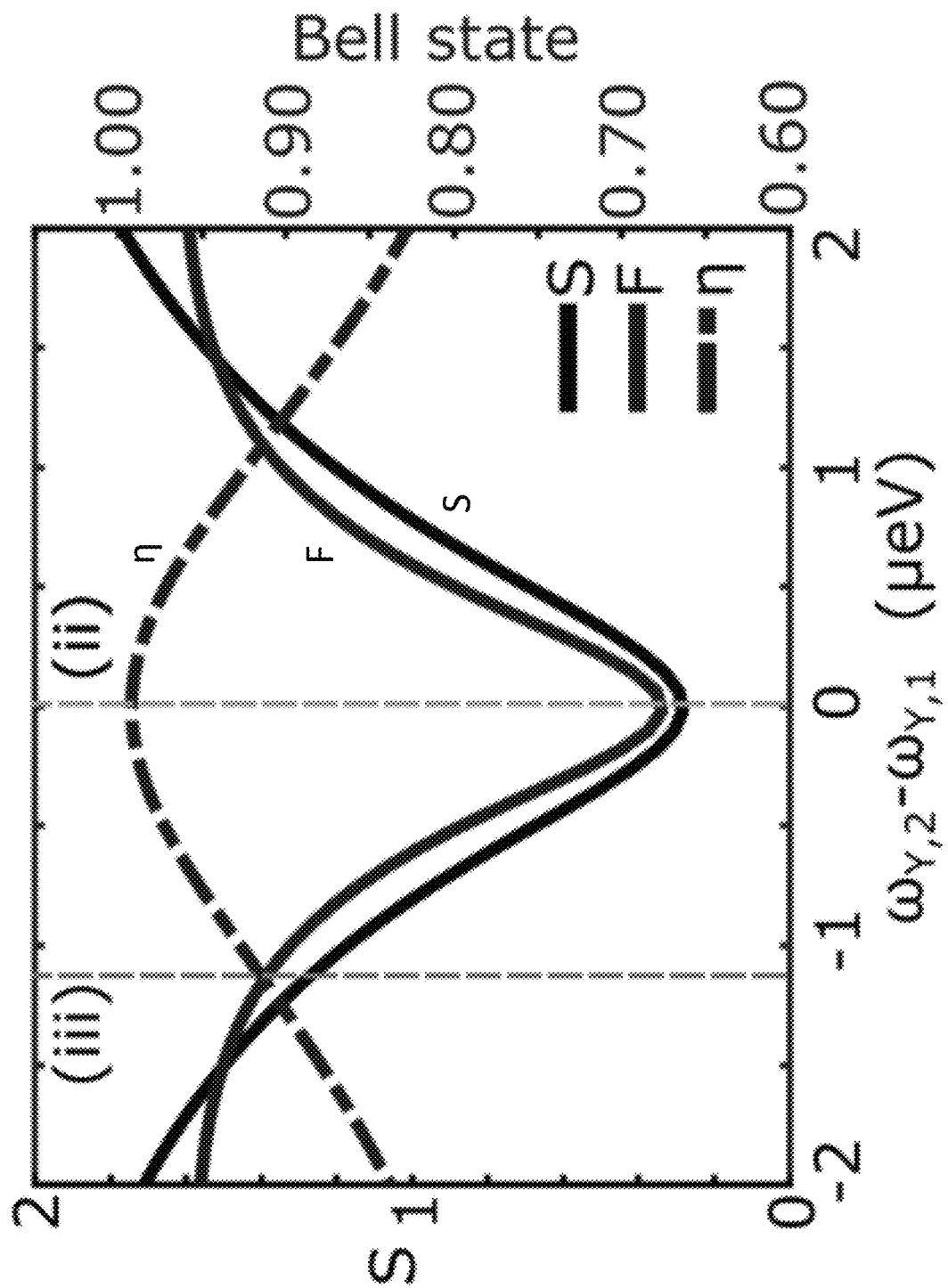
Figure 7C:
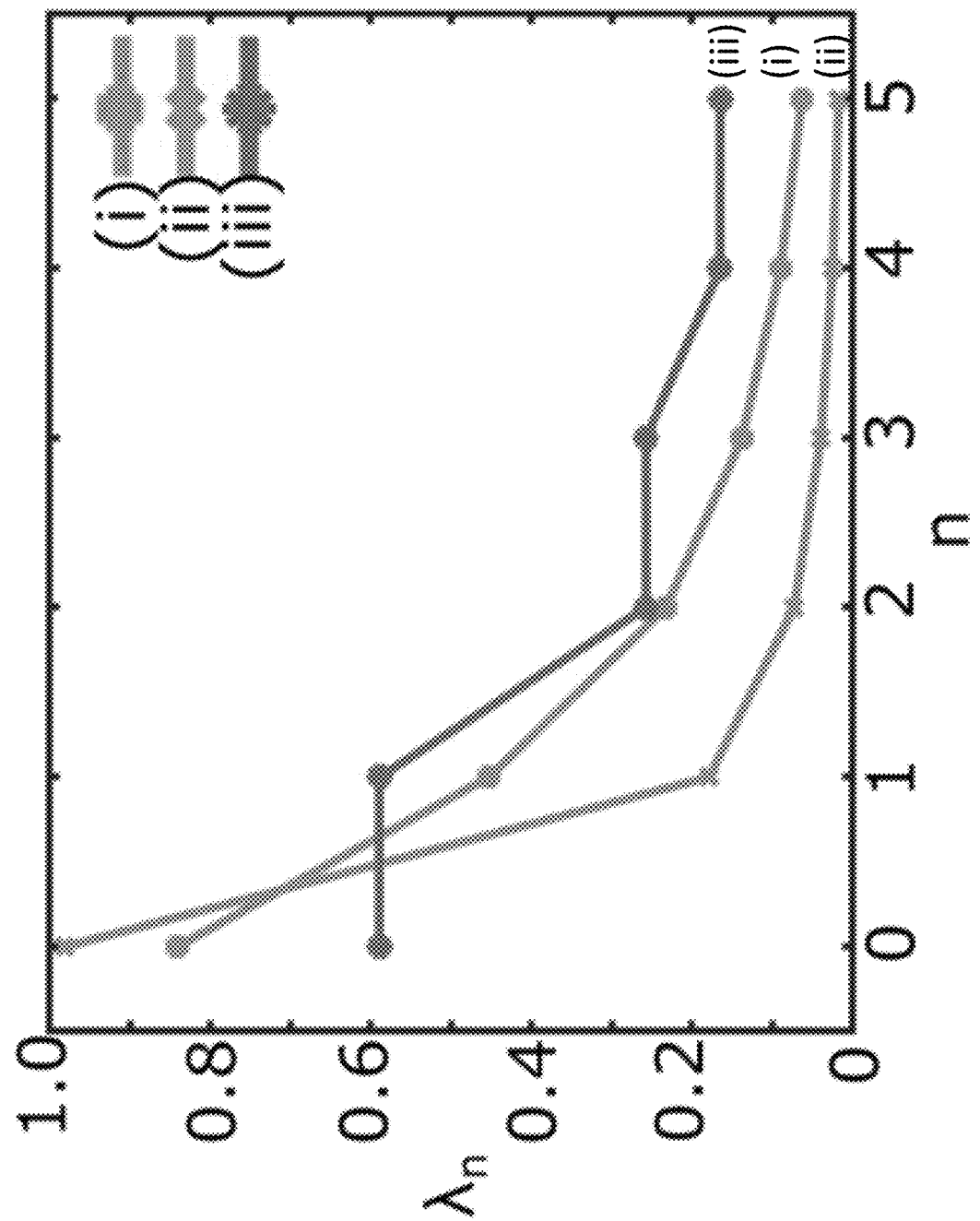

Referring to FIG. 7, entanglement optimization is illustrated. FIG. 7A shows entanglement entropy S, Bell state efficiency $\eta$, and Bell state fidelity $\mathcal{F}$ for varying $\omega_{Y,2}-\omega_{Y,1}=\omega_{X,2}-\omega_{X,1}$, effected by changing $d_x$. The vertical line (i) corresponds to the conditions in FIG. 6. FIG. 7B is a magnified view near $\omega_{Y,2}-\omega_{Y,1}=0$. Both S and $\mathcal{F}$ are minimized at (ii), and both $\eta$ and $\mathcal{F}>0.90$ at (iii). FIG. 7C shows singular values (wave function coefficients) of entangled photon pairs corresponding to conditions marked by (i), (ii), and (iii) in FIGS. 7A-B.

In FIG. 7, it is shown how the entanglement can be optimized by tuning emitter parameters. In FIG. 7A, $d_x$ is swept while holding all other physical parameters described in FIG. 6 constant. As a result, $\omega_{Y,2}[\omega_{X,2}]$ shifts relative to $\omega_{Y,1}[\omega_{X,1}]$, modulating the distance between peaks of the single-photon spectrum of a given polarization. Notably, for the exact conditions plotted in FIG. 6, $d_x=d_y$, $\mathcal{F}$ is nearly 1 while $\eta$=0.69. In FIG. 7B, a zoomed in view is provided of the region around $\omega_{Y,2}=\omega_{Y,1}$, corresponding to $$d_x = \frac{1}{\sqrt{2}}d_y.$$

Here a minimum in S and $\mathcal{F}$ and a maximum in $\eta$ is observed. The entanglement entropy drops here because the frequency of a photon with a given polarization emitted by one of the two decay paths is the same as the photon with a given polarization emitted via the other decay path, so photon pairs emitted by either of the two decay paths are identical. The finite linewidth of the emissions, however, permits entanglement among photon modes within this peak, so the entanglement entropy does not bottom out at 0.

$\mathcal{F}$ and $\eta$ of the Bell pair change in opposite directions surrounding the minimum of $\mathcal{F}$ and S. To understand the origin of this observation, in FIG. 7C plot is provided of the first few Schmidt coefficients $\lambda_n$ when: (i) $d_x=d_y$, corresponding to the state analyzed in FIG. 6, (ii) S and $\mathcal{F}$ are minimized, and (iii) both $\eta$ and $\mathcal{F}>0.90$. In (i), it is seen that $\lambda_n$ come in pairs, meaning that this state is a superposition of many high-fidelity polarization-entangled Bell states. In (ii), where S and $\mathcal{F}$ are minimized, $\lambda_n$ decays more quickly than in (i). Nearly all of the population is concentrated in the first state, so there are fewer entangled states, lowering S. A balance is achieved in (iii) where probability density is concentrated within the first two pairs of entangled states, but $\lambda_0\neq\lambda_1$. Thus, by tuning the transition frequencies, we can optimize for $\mathcal{F}$ or $\eta$.

The entanglement measures are robust to changes in $\omega_{X,1}-\omega_{Y,1}$, and $\mathcal{F}$ and $\mathcal{S}$ are relatively unaffected by up to an order of magnitude increase in $\gamma_{g,y_S}$, as shown below. it is also shown that the fidelity in the presence of dephasing is limited by the radiative linewidth $\sim\gamma_{g,y_S}$, suggesting optimal operation under dilution fridge conditions.

It is noted that the emitted photon pairs can undergo entanglement distillation to further enhance the Bell state fidelity.

A pumping scheme is now described involving two-photon absorption via continuous wave lasers to initialize the composite emitter system in the doubly excited $|xy_S\rangle$ state from which the entangled photon pair is emitted after radiative decay cascade, analogous to schemes proposed for the Mølmer-Sørensen gate and biexcitonic semiconducting quantum dots. A general scenario is considered where the transition frequencies $\omega_{X,1}\neq\omega_{X,2}$ and $\omega_{Y,1}\neq\omega_{Y,2}$. In this case each electronic transition of the system can be selectively addressed by choosing the right polarization and frequency of an external laser drive. In particular, the following two-photon driving Hamiltonian H can be realized if two lasers of polarizations and amplitudes $\varepsilon_x\hat{x}$ and $\varepsilon_y\hat{y}$, and respective frequencies $\tilde{\omega}_{X,1}=\omega_{X,1}+\delta$ and $\tilde{\omega}_{Y,2}=\omega_{Y,2}-\delta$ are used to illuminate the system:

$$\frac{H_{drive}}{\hbar} = |g\rangle\langle x_S|\sqrt{2}\left(\varepsilon_x e^{-i\tilde{\omega}_{X,1}t}+\varepsilon_x^* e^{-i\tilde{\omega}_{X,1}t}\right)+$$
$$|x_S\rangle\langle xy_S|\left(\varepsilon_y e^{-i\tilde{\omega}_{y,2}t}+\varepsilon_y^* e^{i\tilde{\omega}_{y,2}t}\right)+|g\rangle\langle y_S|\sqrt{2}\left(\varepsilon_y e^{-i\tilde{\omega}_{y,2}t}+\varepsilon_y^* e^{i\tilde{\omega}_{y,2}t}\right)+$$
$$|y_S\rangle\langle xy_S|\left(\varepsilon_x e^{-i\tilde{\omega}_{X,1}t}+\varepsilon_x^* e^{-i\tilde{\omega}_{X,1}t}\right)+|x_S\rangle\langle xx|\sqrt{2}\left(\varepsilon_x e^{-i\tilde{\omega}_{X,1}t}+\varepsilon_x^* e^{-i\tilde{\omega}_{X,1}t}\right)+$$
$$|y_S\rangle\langle yy|\sqrt{2}\left(\varepsilon_y e^{-i\tilde{\omega}_{y,2}t}+\varepsilon_y^* e^{i\tilde{\omega}_{y,2}t}\right)+H.c.$$

If it is further assumed that $\delta<|\omega_{X,1}-\omega_{X,2}|$, $|\omega_{Y,1}-\omega_{Y,2}|$, the first two lines of Equation 14 represent a drive that is nearly resonant with the respective electronic transitions, whereas the remaining lines are off resonant. Furthermore, it is assumed that the sum of the drive frequencies is resonant with the two-photon transition from the ground state $|g\rangle$ to the doubly excited state $|xy_S\rangle$ ($\tilde{\omega}_{X,1}+\tilde{\omega}_{Y,1}=\omega_{X,1}+\omega_{Y,2}$). In this case it is possible to apply the rotating-wave approximation and neglect the off-resonant terms:

$$\frac{H_{drive}}{\hbar} \approx |g\rangle\langle x_S|\sqrt{2}\varepsilon_x^* e^{i\tilde{\omega}_{X,q}t}+|x_S\rangle\langle xy_S|\varepsilon_y^* e^{i\tilde{\omega}_{Y,2}t}+H.c. \qquad \text{Equation 15}$$

The effective Hamiltonian of the driven system is derived by first considering the dynamics of a trial wave function:

$$|\psi_{drive}\rangle = a^g|g\rangle + a^{x_S}|x_S\rangle + a^{y_S}|y_S\rangle + a^{xy_S}|xy_S\rangle \qquad \text{Equation 16}$$

under the Hamiltonian in Equation 15 expressed in the interaction picture with respect to the Hamitonian of the bare system (neglecting the small broadening due to spontaneous emission for the purpose of this derivation):

$$\frac{H_{sys}}{\hbar} = \omega_{X,1}|x_S\rangle\langle x_S| + \omega_{Y,1}|y_S\rangle\langle y_S| + \omega_{xy_S}|xy_S\rangle\langle xy_S| \quad \text{Equation 17}$$

The following differential equations can be obtained:

$$\dot{a}^g = -i\sqrt{2}\varepsilon_x^* e^{i\delta t}a^{x_S} - i\sqrt{2}\varepsilon_y^* e^{-i(\omega_{Y,1}-\tilde{\omega}_{Y,2})t}a^{y_S} \quad \text{Equation 18}$$

$$\dot{a}^{x_S} = -i\sqrt{2}\varepsilon_x e^{i(\omega_{X,1}-\tilde{\omega}_{X,1})t}a^g - i\varepsilon_y^* e^{-i(\omega_{Y,2}-\tilde{\omega}_{Y,2})t}a^{xy_S} \quad \text{Equation 19}$$

$$\dot{a}^{y_S} = -i\sqrt{2}\varepsilon_y e^{i(\omega_{Y,1}-\tilde{\omega}_{Y,2})t}a^g - i\varepsilon_x^* e^{-i(\omega_{X,2}-\tilde{\omega}_{X,1})t}a^{xy_S} \quad \text{Equation 20}$$

$$\dot{a}^{xy_S} = -i\varepsilon_x e^{i(\omega_{X,2}-\tilde{\omega}_{X,1})t}a^{y_S} - i\varepsilon_y e^{i\delta t}a^{x_S} \quad \text{Equation 21}$$

Equation 19 and Equation 20 can be used to eliminate $a^{x_S}$ and $a^{y_S}$ in the adiabatic approximation:

$$a^{x_S} \approx \frac{\sqrt{2}\varepsilon_x a^g + \varepsilon_y^* a^{xy_S}}{\delta}e^{-i\delta t} \quad \text{Equation 22}$$

$$a^{y_S} \approx \frac{\sqrt{2\varepsilon_y}}{\tilde{\omega}_{Y,2}\omega_{Y,1}}e^{-i(\tilde{\omega}_{Y,2}-\omega_{Y,1})t}a^g + \frac{\varepsilon_x^*}{\omega_{X,2}-\tilde{\omega}_{X,1}}e^{-i\omega_{X,2}-\tilde{\omega}_{X,1})t}a^{xy_S} \quad \text{Equation 23}$$

Equation 22 and Equation 23 can be inserted into Equation 18 and Equation 21. Neglecting rotating terms and small energy shifts, the effective dynamics are $$\dot{a}^g = -ig_{eff}a^{xy_S} \quad \text{Equation 24}$$

$$\dot{a}^{XY_S} = -ig_{eff}^* a^g \quad \text{Equation 25}$$

which correspond to the effective Hamiltonian $$H_{drive}^{eff} \approx \hbar g_{eff}|g\rangle\langle xy_s| + H.c. \quad \text{Equation 26}$$

with $$g_{eff} = \frac{\sqrt{2}\varepsilon_x^*\varepsilon_y^*}{\delta} \quad \text{Equation 27}$$

This Hamiltonian induces Rabi oscillations between $|g\rangle$ and $|xy_S\rangle$ with frequency $2|g_{eff}|$. If the illumination is applied for time $\tau_{drive} = \pi/(2|g_{eff}|)$ the system is driven from the ground state to the desired state $|xy_S\rangle$.

An analogous pumping scheme exploiting the state $|y_S\rangle$ with two lasers of polarizations and amplitudes $\varepsilon_x\hat{x}$ and $\varepsilon_y\hat{y}$, and respective frequencies $\tilde{\omega}_{X,2} = \omega_{X,2} - \delta$ and $\tilde{\omega}_{Y,1} = \omega_{Y,1} + \delta$ could be used to drive the system into the doubly excited state as well. It will be appreciated that a variety of alternative pumping schemes may be applied.

The present disclosure provides the basis for a deterministic entangled photon pair source from dipole-coupled emitters. Specifically, two three-level emitter systems are dipole-coupled, each with excited states with orthogonal transition dipole moments, to form a composite emitter system. When the composite emitter system is excited to a symmetric doubly excited state and subsequently de-excites in a radiative cascade, two entangled photons are emitted. The entanglement measures of the emitted photons are robust to relative differences in frequency between the intermediate states. Importantly, the Bell state fidelity $\mathcal{F}$ and efficiency $\eta$ can be optimized, for example, by tuning the defect transition dipole moments.

The schemes provided herein are especially amenable to defect emitters, although quantum dots or fixed molecules may be used to realize the scheme as well. Defects in both 2D and 3D have wide applicability in quantum technologies, especially as quantum memories because they combine the favorable coherence and non-classical emission properties of isolated atoms with the scalability and stability of solid-state technologies. A use case that highlights their applicability is the experimental demonstration of memory-enhanced quantum communication for quantum repeaters.

Defects are suitable candidates because of their fixed geometries enabling stable dipole-coupling, diverse symmetries that allow well-defined and orthogonal transition dipole moments, and emission properties that can be tailored chemically or externally and can be integrated on-chip for a variety of quantum technologies. In addition, the chemical selection space of defect systems is vast, as the chemical identity of the defect and surrounding matrix can be permuted to discover the appropriate system for a specific application. Because accurately computing multiply excited states remains a significant challenge, the present scheme involving just singly excited states is more amenable to computational searches of defect system candidates. A current challenge of realizing defect-based quantum emitters, however, is the relatively low phonon-limited quantum efficiency, the highest of which has been observed to be 87%±7% for single-photon emitters in hBN as compared to theoretical predictions of >96% phonon-limited quantum efficiency in semiconductor quantum dots with realistic experimental parameters. System imperfections of defect-based systems may be modulated by coupling defects to external fields, including electric, magnetic, and strain, as well as to waveguides and sculpted electromagnetic environments of cavities to improve fidelity and collection efficiency.

Dipole Operator

The dipole operator is written in the eigenbasis of the total electronic Hamiltonian $H_{el}$ in Table II (FIG. 11).

Weisskopf-Wigner Approximation

Here it is explicitly show how to obtain Equation 7, the wave function coefficient of the steady state electron-photon state.

The ansatz for a general electron-photon wave function is produced from Equation 5:

$$|\Psi(t)\rangle = \sum_{jk} c_{jk}^g |g\rangle s_{jX}^\dagger a_{kY}^\dagger |vac\rangle + \sum_j c_j^{x_S}|x_S\rangle a_{jY}^\dagger|vac\rangle + \sum_j c_j^{y_S}|y_S\rangle a_{jX}^\dagger|vac\rangle + c^{xy_S}|xy_S\rangle|vac\rangle \quad \text{Equation 28}$$

The interaction Hamiltonian is:

$$H_{int} = \sum_j \Omega_{y_S,xy_S}|y_S, 1_{jX}, 0_{kY}\rangle\langle xy_S| + \quad \text{Equation 29}$$

$$H.c. + \sum_j \Omega_{x_S,xy_S}|x_S, 0_{kX}, 1_{jY}\rangle\langle xy_S| +$$

$$H.c. + \sum_{jk} \Omega_{g,y_S}|g, 1_{jX}, 1_{kY}\rangle\langle y_S, 1_{jX}, 0_{kY}| +$$

$$H.c. + \sum_{jk} \Omega_{g,x_S}|g, 1_{jX}, 1_{kY}\rangle\langle x_S, 0_{jX}, 1_{kY}| + H.c.$$

This state vector is now plugged into the Schrödinger equation to derive the differential equations for the coefficients:

$$\frac{d}{dt}x^{xy_S} = -i\omega_{xy_S}c^{xy_S} - i\sum_j \omega_{y_S,xy_S}c_j^{y_S} - i\sum_j \Omega_{x_S,xy_S}c_j^{x_S},$$ Equation 30

$$\frac{d}{dt}c_j^{x_S} = -i(\omega_{x_S}+\omega_j)c_j^{x_S} - i\Omega_{x_S,xy_S}c^{xy_S} - i\sum_k \Omega_{g,x_S}c_{jk}^g,$$ Equation 31

$$\frac{d}{dt}c_j^{y_S} = -i(\omega_{y_S}+\omega_j)c_j^{y_S} - i\Omega_{y_S,xy_S}c^{xy_S} - i\sum_k \Omega_{g,y_S}c_{jk}^g,$$ Equation 32

$$\frac{d}{dt}c_{jk}^g = -i(\omega_j+\omega_k)c_{jk}^g - i\Omega_{g,y_S}c_j^{y_S} - i\Omega_{g,x_S}c_j^{x_S},$$ Equation 33 where it is assumed $\Omega_{op}$ is real. The differential equations are now solved in the Weisskopf-Wigner approximation. Equation 31 is formally integrated:

$$c_j^{x_S} = c_j^{x_S}(0)e^{-i(\omega_{x_S}+\omega_k)t} - i\Omega_{x_S,xy_S}\int_0^t e^{-i(\omega_{x_S}+\omega_k)(t-\tau)}c^{xy_S}(\tau)d\tau - i\Omega_{g,x_S}\int_0^t e^{-i(\omega_{x_S}+\omega_k)(t-\tau)}c_{jk}^g(\tau)d\tau.$$ Equation 34

An analogous equation is obtained for $c_j^{y_S}$ and both are inserted into Equation 30:

$$\left(\frac{d}{dt}c\right)^{xy_S} = -i\omega_{xy_S}c^{xy_S} -$$ Equation 35
$$i\sum_j \omega_{y_S,xy_S}\left(-i\Omega_{y_S,xy_S}\int_0^t e^{-i(\omega_{y_S}+\omega_k)(t-\tau)}c^{xy_S}(\tau)d\tau - i\Omega_{g,y_S}\int_0^t e^{-i(\omega_{x_S}+\omega_k)(t-\tau)}c_{jk}^g(\tau)d\tau\right) -$$
$$i\sum_i \Omega_{x,xy_S}\left(-i\Omega_{x_S,xy_S}\int_0^t e^{-i(\omega_{x_S}+\omega_k)(t-\tau)}c^{xy_S}(\tau)d\tau - i\Omega_{g,x_S}\int_0^t e^{-i(\omega_{x_S}+\omega_k)(t-\tau)}c_{jk}^g(\tau)d\tau\right),$$

In the Weisskopf-Wigner approximation it is commonly assumed that the time integrals can be extended to infinity and that the $\tau$ dependent coefficients can be extracted from the integral by setting $\tau=t$. Since we are operating in the Schrödinger picture we have to perform this procedure with caution and we have to define the slowly-varying amplitudes of a coefficient $c^A(\tau)=e^{-i\omega_A \tau}\tilde{c}^A(\tau)$. We then set $\tilde{c}^A(\tau)\approx\tilde{c}^A(t)$, which is equivalent to performing the Markov approximation in the interaction picture. This approximation yields:

$$-\sum_j |\Omega_{y_S,xy_S}|^2 \int_0^t e^{-i(\omega_{y_S}+\omega_k)(t-\tau)}e^{i\omega_{xy_S}\tau}\tilde{c}^{xy_S}(\tau)d\tau \approx$$ Equation 36

$$-\sum_j |\Omega_{y_S,xy_S}|^2 \tilde{c}^{xy_S}(t)\int_0^t e^{-i(\omega_{y_S}+\omega_k)(t-\tau)}e^{-i\omega_{xy_S}\tau}d\tau.$$

The integral in the last line can be further decomposed and the lower integration limit can be extended to $-\infty$:

$$e^{-i(\omega_{y_S}+\omega_k)t}\int_{-\infty}^t e^{-i(\omega_{xy_S}-\omega_{y_S}-\omega_j)\tau}d\tau \approx$$ Equation 37
$$e^{-i\omega_{xy_S}t}\left(\pi\delta(\omega_{xy_S}-\omega_{y_S}-\omega_j) + iP\left\{\frac{1}{\omega_{xy_S}-\omega_{y_S}-\omega_j}\right\}\right)$$

The imaginary part of the parenthesis on the second line are neglected, the principal part (P{ }) that generally leads to a spectral shift, and we retain only the delta function. In the discrete case $\delta(\omega_k-\omega_j)\to\delta_{jk}/\Delta$ (which is a discrete representation of the delta function). Notice also that $$e^{-i\omega_{xy_S}t}\tilde{c}^{xy_S}(t) = c^{xy_S}(t).$$

This yield the following result:

$$-\sum_j |\Omega_{y_S,xy_S}|^2 \int_0^t e^{-i(\omega_{y_S}+\omega_k)(t-\tau)}c^{xy_S}(\tau)d\tau \approx$$ Equation 38
$$-\frac{\pi|\Omega_{y_S,xy_S}|^2}{\Delta}c^{xy_S}(t) \equiv -\gamma_{y_S,xy_S}c^{xy_S}(t).$$

A similar result is obtained for the first term in the second parenthesis of Equation 35:

$$\approx -\gamma_{x_S,xy_S}c^{xy_S}(t)$$ Equation 39

The remaining terms in Equation 35 yield after applying the same procedure:

$$-\pi\sum_j [\Omega_{y_S,xy_S}\Omega_{g,y_S}c_{jk}^g(t)\delta(\omega_k-\omega_{y_S}) +$$ Equation 40
$$\Omega_{x_S,xy_S}\Omega_{g,x_S}c_{kj}^g(t)\delta(\omega_k-\omega_{x_S})].$$

This term is neglected in the calculations because of the frequency restriction imposed by the delta function, although in principle this term is of the same order as the terms leading to decay. The following is therefore obtained:

$$\frac{d}{dt}x^{xy_S} = -i\omega_{xy_S}c^{xy_S} - (\gamma_{x_S,xy_S}+\gamma_{y_S,xy_S})c^{xy_S}$$ Equation 41

Similarly the remaining differential equations can be derived:

$$\frac{d}{dt}c_j^{x_S} = -i(\omega_{x_S}+\omega_j)c_j^{x_S} - \gamma_{g,x_S}c_j^{x_S} - i\Omega_{x_S,xy_S}c^{xy_S}$$ Equation 42

$$\frac{d}{dt}c_j^{y_S} = -i(\omega_{y_S}+\omega_j)c_j^{y_S} - \gamma_{g,y_S}c_j^{y_S} - i\Omega_{y_S,xy_S}c^{xy_S}$$ Equation 43

This system of equations can be solved with the initial conditions:

$$c^{xyS}(0)=1,$$

$$c_j^{xS}(0)=c_j^{yS}(0)=c_{jk}^{g}(0)=0 \quad \text{Equation 45}$$

with the following steady-state solution in the rotating frame:

$$\tilde{c}_{jk}^{g}(\infty) = \frac{\frac{-\Omega_{g,x_S}\omega_{x_S,xy_S}}{i\omega_{x_S}-i\omega_j+\gamma_{g,x_S}}+\frac{-\Omega_{g,y_S}\Omega_{y_S,xy_S}}{i\omega_{y_S}-i\omega_k+\gamma_{g,y_S}}}{i(\omega_{xy_S}-\omega_j-\omega_k)+\gamma_{x_S,xy_S}+\gamma_{y_S,xy_S}} \quad \text{Equation 46}$$

which matches Equation 7.

Robust Entanglement

Figure 8A:
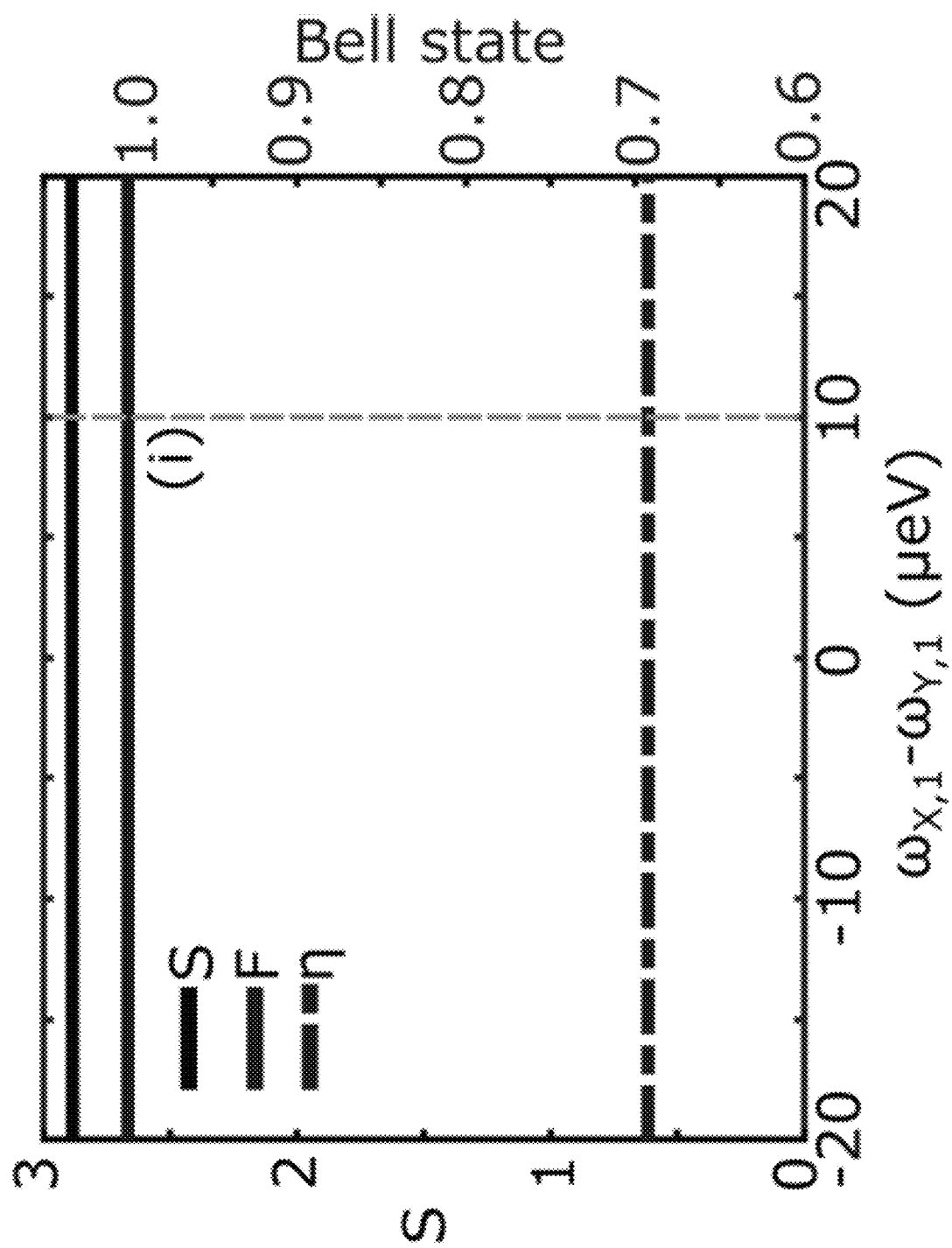
FIGS. 8A-B are graphs of entanglement entropy S, Bell state efficiency η, and Bell state fidelity $\mathcal{F}$ according to embodiments of the present disclosure.
Figure 8B:
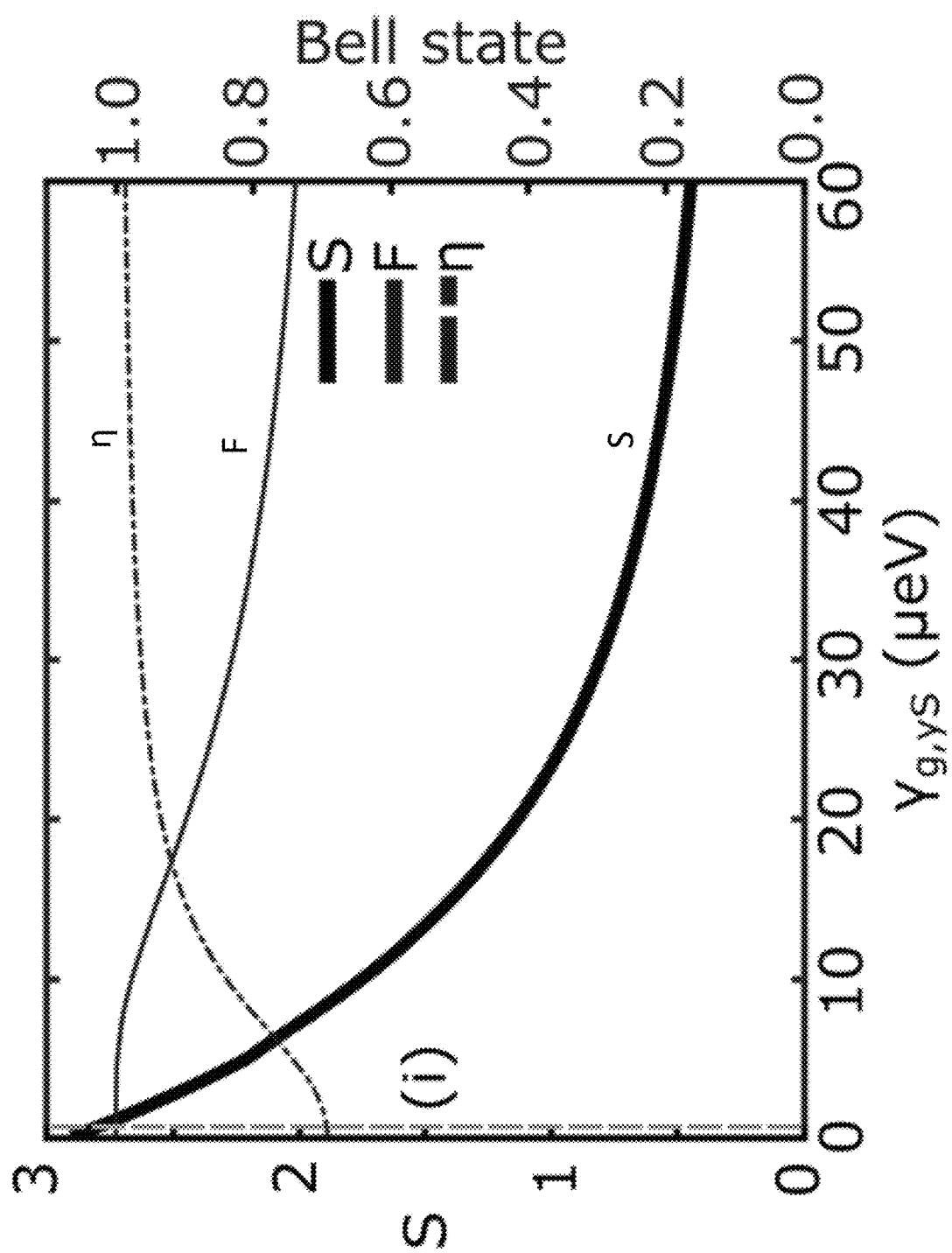

FIG. 8 illustrates entanglement entropy S, Bell state fidelity $\mathcal{F}$, and Bell state efficiency η. In FIG. 8A, they are shown to be unaffected by varying $\omega_{X,1}$. FIG. 8B shows that they are impacted by increasing the emission line width. The pink line (i) corresponds to the conditions in FIG. 6.

In FIG. 8, it is shown that the entanglement of the emitted photon pair is robust to changes in $\omega_{X,1}$ relative to $\omega_{Y,1}$, while $\mathcal{F}$ and S decrease as $\gamma_{g,y_S}$ increases.

Dephasing

The following considered the impact of emitter imperfections, such as phonon-based dephasing of defect emitters, that results in fluctuations in the energies of the defect emitters. The effect of dephasing is implemented by averaging the final states of the emitted photons over an ensemble of quantum states generated using a probability distribution of emitter frequencies reflecting the broadening of the transition frequencies due to dephasing effects.

The fidelity $\mathcal{F}$ in the presence of dephasing can be estimated as $$\mathcal{F}_{de}=\iiint[d\omega_{x_S}{}^0 d\omega_{y_S}{}^0 d\omega_{xy_S}{}^0 P(\omega_{x_S}{}^0,\omega_{y_S}{}^0,\omega_{xy_S}{}^0,\sigma)|\langle\psi_{de}(\omega_{x_S}{}^0,\omega_{y_S}{}^0,\omega_{xy_S}{}^0)|\Psi^+\rangle|^2], \quad \text{Equation 47}$$

where $|\psi_{de}(\omega_{x_S},\omega_{y_S},\omega_{xy_S})\rangle$ is calculated just as $|\psi\rangle$ is in Equation 11, except that the central frequencies of the emitters $\omega_i$ are substituted by $\omega_i^0$ in Equation 7 where $i\in\{x_S, y_S, xy_S\}$. Explicitly, $|\psi\rangle=|\psi_{de}(\omega_{x_S},\omega_{y_S},\omega_{xy_S})\rangle$, as in Equation 11. It is assumed that $\omega_{x_S}^0$, $\omega_{y_S}^0$, and $\omega_{xy_S}^0$ belong to a probability distribution P. While the exact probability distribution depends on the microscopic physical mechanism underlying dephasing, P is represented as a 3D Gaussian $\Pi_i G_i(\Delta\omega_i, \sigma)$, physically representing independent fluctuations of the energy levels of the relevant excited states following a Gaussian distribution.

Figure 9:
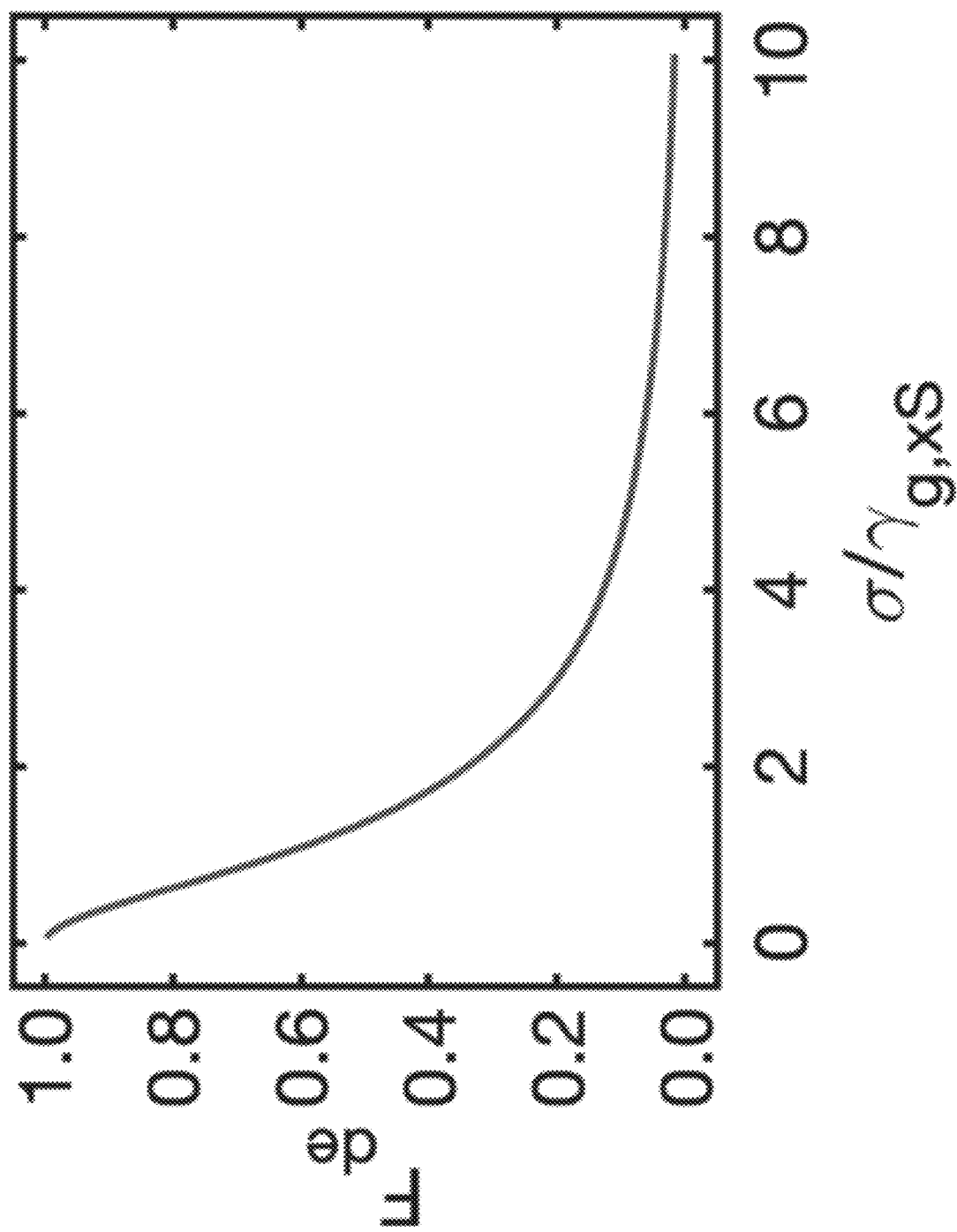
FIG. 9 is a graph of fidelity according to embodiments of the present disclosure.

FIG. 9 illustrates fidelity $\mathcal{F}_{de}$ in the presence of Gaussian dephasing with dephasing rate σ, normalized by the radiative rate $\gamma_{g,xS}$, for the conditions corresponding to the pink line in FIG. 7-8.

The fidelity is plotted in the presence of phonon-based dephasing in FIG. 9, where $\sigma_i$ is the full width at half maximum representing the dephasing rate and $\Delta\omega_i=\omega_i^0-\omega_i$. The fidelity in the presence of dephasing $\mathcal{F}_{de}$ is limited by the radiative linewidth $\gamma_{g,xS}$, suggesting ideal operation in dilution fridges for the rates described here.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

All patents, published applications, and references cited herein are hereby incorporated by reference in their entirety.

What is claimed is:

1. A device, comprising:
    a substrate comprising at least a first and a second quantum emitters, said first and second quantum emitters forming a quantum system, the at least first and second quantum emitters being dipole-dipole coupled; and
    a coherent light source optically coupled to the substrate, wherein:
        each of the first and second quantum emitters has a ground state and at least a first and a second excited states, wherein the at least first and second excited states have transition dipole moments with respect to the ground state, said dipole moments being orthogonal, and
    the coherent light source is configured to prepare the quantum system in a state of symmetric superposition of two quantum states of the system: (i) a state in which the first quantum emitter is in the first excited state and the second quantum emitter is in the second excited state, and (ii) a state in which the first quantum emitter is in the second excited state and the second quantum emitter is in the first excited state.

2. The device of claim 1, wherein the at least first and second quantum emitters each comprise a defect in the substrate.

3. The device of claim 2, wherein each defect comprises an atomic substitution.

4. The device of claim 2, wherein substrate is an electrical insulator or a semiconductor having a bandgap.

5. The device of claim 4, wherein, for each defect, the ground state and the at least two excited states are within the bandgap.

6. The device of claim 2, wherein the defects are disposed with a separation of 2 nm to 200 nm.

7. The device of claim 4, wherein the substrate comprises hexagonal boron nitride, transition metal dichalcogenides, diamond, silicon carbide, or aluminum oxide.

8. A method of producing entangled photon pairs, the method comprising:
    configuring a coherent light source to prepare a quantum system in a target quantum state,
    wherein the quantum system comprises a first and a second quantum emitters, each of the first and second quantum emitters having a ground state and at least a first and a second excited states having transition dipole moments with respect to the ground state, said dipole moments being orthogonal,
    wherein the target quantum state is a state of symmetric superposition of two quantum states of the system: (i) a state in which the first quantum emitter is in a first excited state and the second quantum emitter is in a second excited state, and (ii) a state in which the first quantum emitter is in a second excited state and the second quantum emitter is in a first excited state; and
    illuminating by the coherent light a substrate comprising the at least first and second quantum emitters, the at least first and second quantum emitters being dipole-dipole coupled.

9. The method of claim 8, wherein the at least first and second quantum emitters each comprise a defect in the substrate.

10. The method of claim 9, wherein each defect comprises an atomic substitution.

11. The method of claim 9, wherein substrate is an electrical insulator or a semiconductor having a bandgap.

12. The method of claim 11, wherein, for each defect, the ground state and the at least two excited states are within the bandgap.

13. The method of claim 9, wherein the defects are disposed with a separation of 2 nm to 200 nm.

14. The method of claim 11, wherein the substrate comprises hexagonal boron nitride, transition metal dichalcogenides, diamond, silicon carbide, or aluminum oxide.

* * * * *